US012120573B2

(12) United States Patent
Niu et al.

(10) Patent No.: US 12,120,573 B2
(45) Date of Patent: Oct. 15, 2024

(54) CELL RESELECTION AND MEASUREMENT IN A HIGH-SPEED MODE IN WIRELESS COMMUNICATIONS

(71) Applicant: Apple Inc., Cupertino, CA (US)

(72) Inventors: Huaning Niu, San Jose, CA (US); Qiming Li, Beijing (CN); Dawei Zhang, Saratoga, CA (US); Jie Cui, San Jose, CA (US); Manasa Raghavan, Sunnyvale, CA (US); Xiang Chen, Campbell, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 406 days.

(21) Appl. No.: 17/441,689

(22) PCT Filed: Jan. 13, 2021

(86) PCT No.: PCT/CN2021/071454
§ 371 (c)(1),
(2) Date: Sep. 21, 2021

(87) PCT Pub. No.: WO2022/151037
PCT Pub. Date: Jul. 21, 2022

(65) Prior Publication Data
US 2023/0116740 A1    Apr. 13, 2023

(51) Int. Cl.
*H04W 36/08* (2009.01)
*H04W 36/00* (2009.01)
*H04W 36/32* (2009.01)

(52) U.S. Cl.
CPC ....... *H04W 36/32* (2013.01); *H04W 36/0085* (2018.08)

(58) Field of Classification Search
CPC ............. H04W 28/00; H04W 28/0226; H04W 36/085; H04W 36/00; H04W 36/10;
(Continued)

(56) References Cited

U.S. PATENT DOCUMENTS

2005/0143089 A1   6/2005 Dowling et al.
2018/0199310 A1*  7/2018 Islam .................. H04W 68/025
(Continued)

FOREIGN PATENT DOCUMENTS

CN    104168614    11/2014
EP     3512260     7/2019

OTHER PUBLICATIONS

The International Application No. PCT/CN2021/071454, "International Preliminary Report on Patentability," mailed Jul. 27, 2023, 7 pages.
(Continued)

*Primary Examiner* — Michael Thier
*Assistant Examiner* — Prince A Mensah
(74) *Attorney, Agent, or Firm* — Kilpatrick Townsend & Stockton LLP

(57) ABSTRACT

The present application relates to devices and components including apparatus, systems, and methods to perform cell reselection. In an example, timing requirements for synchronization signal processing are defined based on a beam sweeping capability of the device. Synchronization signals are received and processed according to the timing requirements to complete a cell reselection procedure. In another example, location data of the device is used to look up a database of cell identifiers. A cell identifier is determined based on the look-up and a cell reselection procedure is performed using the cell identifier.

20 Claims, 12 Drawing Sheets

(58) Field of Classification Search
CPC ..... H04W 36/12; H04W 36/32; H04W 36/34;
H04W 36/0085
See application file for complete search history.

(56) References Cited

U.S. PATENT DOCUMENTS

2019/0379441 A1* 12/2019 Priyanto ............... H04L 5/0048
2022/0078747 A1*  3/2022 Duan ................... H04L 5/0051
2022/0191754 A1*  6/2022 Yao .................. H04W 36/0058

OTHER PUBLICATIONS

CR on EMR Requirements in 36.133, 3GPP TSG-RAN4 Meeting #97-e, R4-2015743, Nov. 2-13, 2020, 6 pages.
Idle Mode Procedures in NR NTN, 3GPP TSG-RAN WG2 Meeting #112-e, R2-2009255, Nov. 2-13, 2020, 6 pages.
International Patent Application No. PCT/CN2021/071454, International Search Report and Written Opinion, Mailed on Oct. 20, 2021, 10 pages.
3rd Generation Partnership Project; Technical Specification Group Radio Access Network; NR; Requirements for support of radio resource management (Release 16), 3GPP TS 38.133 V16.5.0, Sep. 2020, 1608 pages.

* cited by examiner

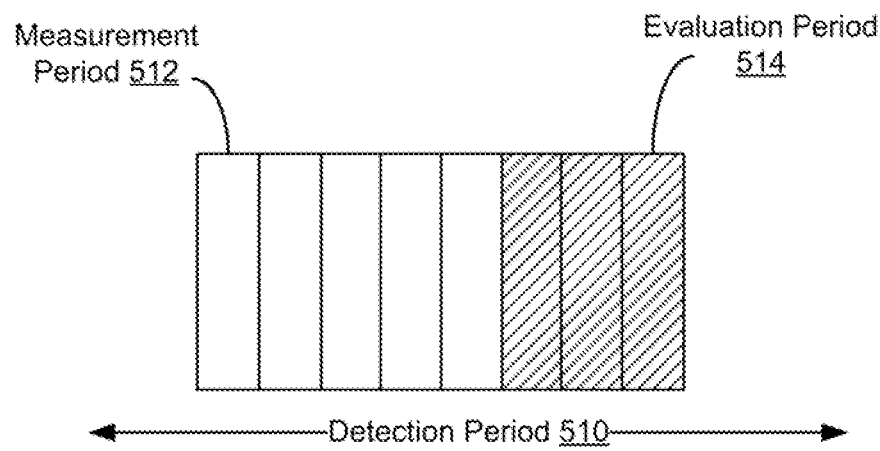
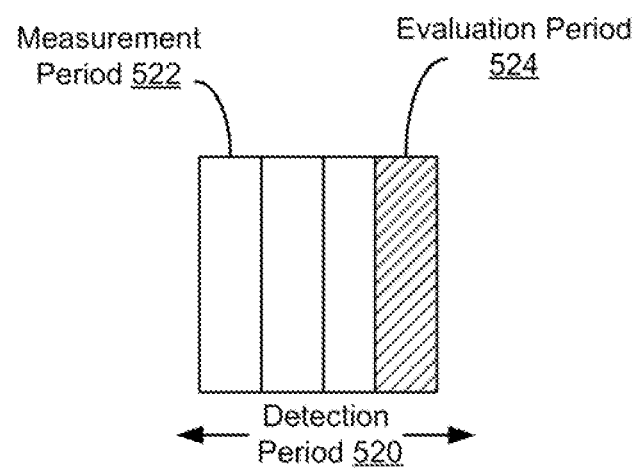
Figure 5

900

Storing database that associates the cell identifiers with respective locations and respective synchronization signal block (SSB) absolute radio frequency channel numbers (ARFCNs) 902

↓

Reporting capability to perform cell reselection based on location data 904

↓

Determining that an operational mode of the device is a high speed mode that supports a travel speed larger than a speed threshold 906

↓

Determining a location of the device 908

↓

Determining, based on the high speed mode and the location, an identifier of a cell from a set of cell identifiers 910

↓

Performing a cell reselection based on the identifier 912

Figure 9

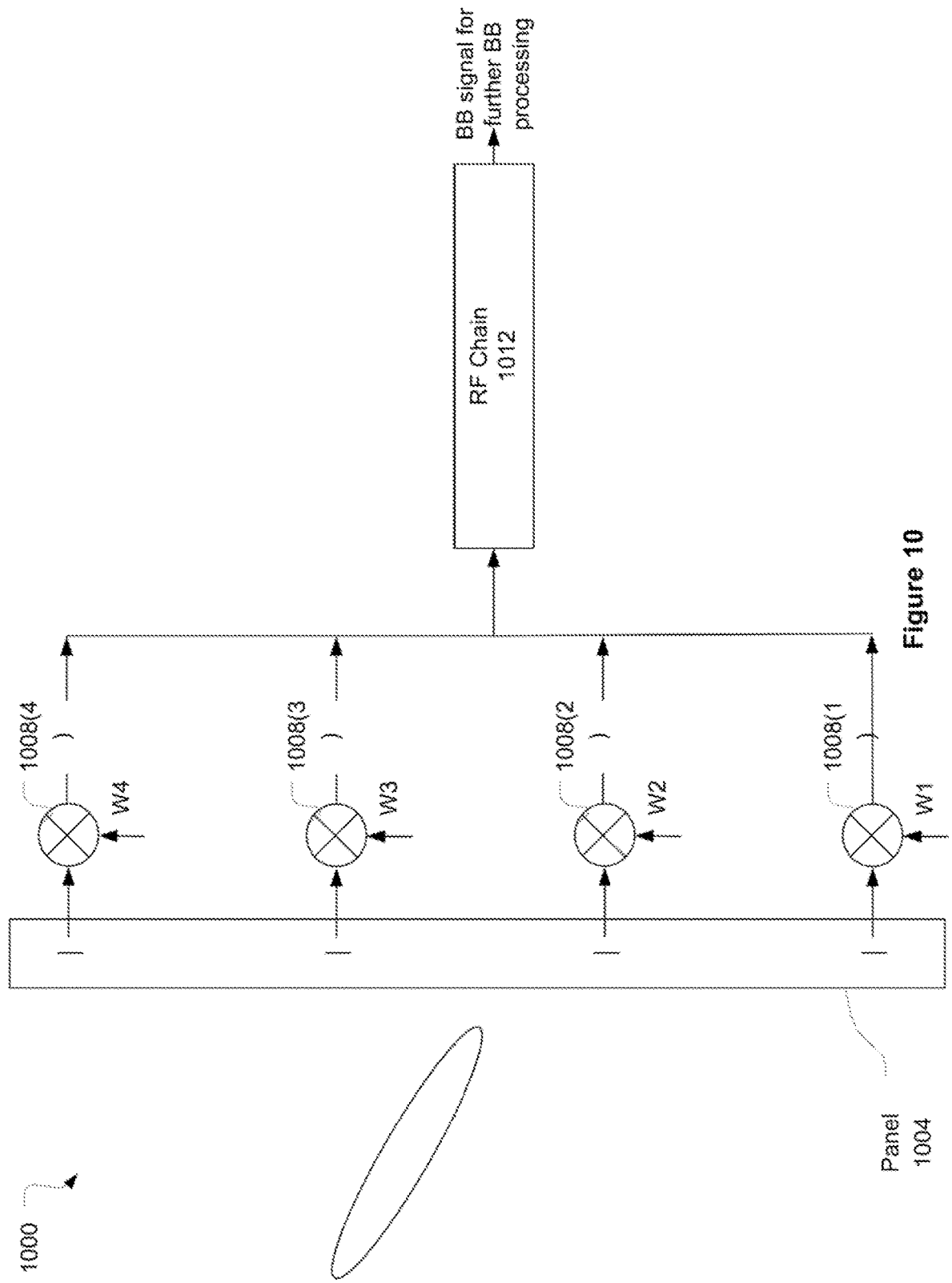

CELL RESELECTION AND MEASUREMENT IN A HIGH-SPEED MODE IN WIRELESS COMMUNICATIONS

CROSS REFERENCES TO RELATED APPLICATIONS

This application is the U.S. National Phase of PCT Application No. PCT/CN2021/071454, filed Jan. 13, 2021, the disclosure of which is incorporated by reference in its entirety.

Fifth generation mobile network (5G) is a wireless standard that aims to improve upon data transmission speed, reliability, availability, and more. This standard, while still developing, includes numerous details relating to cell reselection, where, for instance, a user equipment (UE) can move between cells and update its communications accordingly.

BRIEF DESCRIPTION OF THE DRAWINGS

FIG. 5 illustrates examples of timing requirements for cell reselection by a UE operating in a high-speed mode and in an idle mode, in accordance with some embodiments.

FIG. 9 illustrates an example of an operational flow/algorithmic structure for performing a location-based cell reselection in a high-speed mode, in accordance with some embodiments.

FIG. 10 illustrates an example of receive components, in accordance with some embodiments.

DETAILED DESCRIPTION

Figure 1:
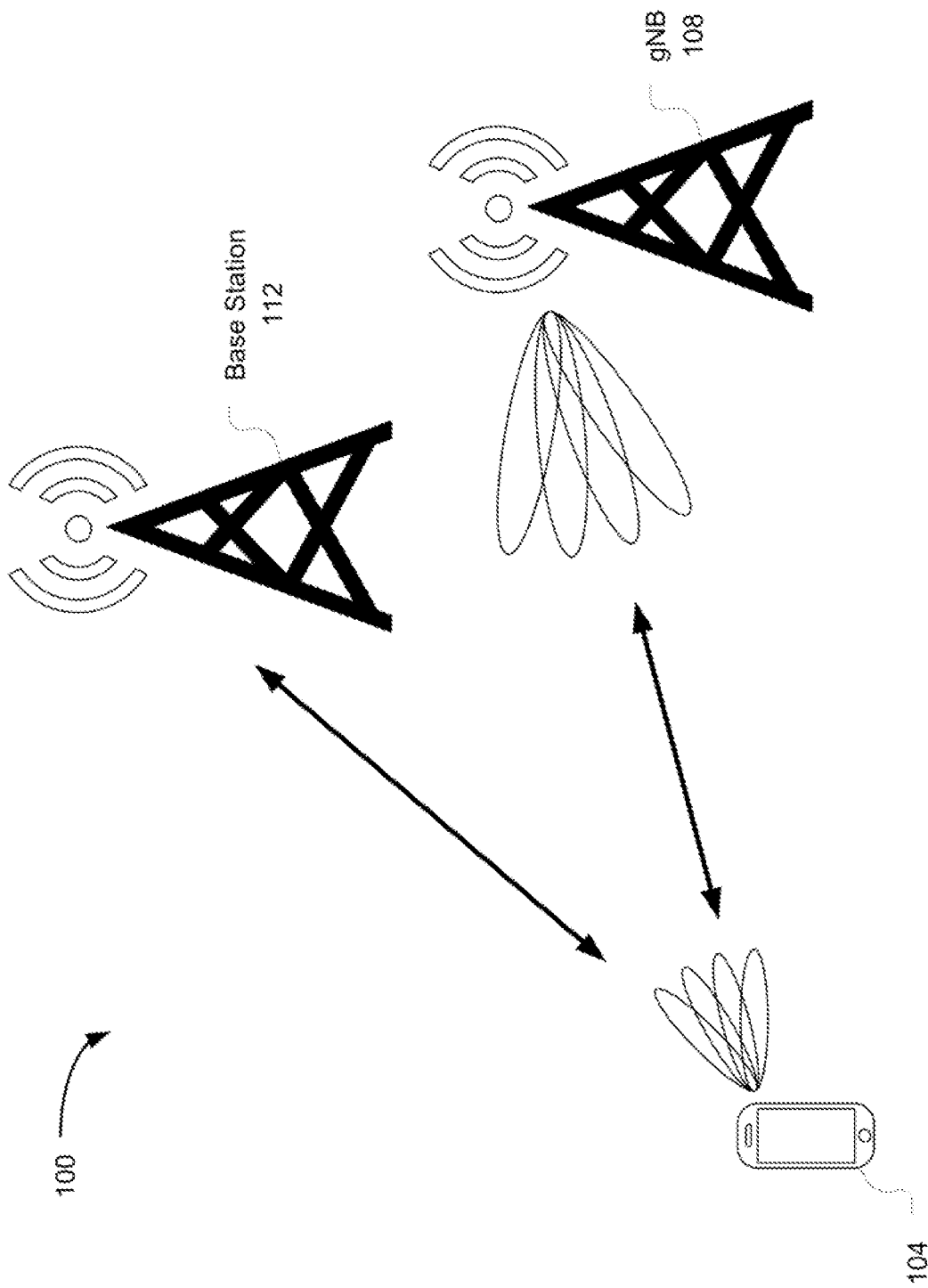
FIG. 1 illustrates an example of a network environment, in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Generally, a user equipment (UE) is mobile and can be surrounded by multiple base stations that provide different cell coverage at different signal strengths relative to the UE's location. Cell reselection includes a procedure to change a cell such that the UE stays connected to the cell that has the best conditions among the different cells. The cell reselection procedure can involve multiple measurements using synchronization signals.

In fifth generation mobile network (5G) networks, multiple frequency bands are contemplated. Among the frequency bands, cells can use a frequency range 2 (FR2) band (between 24,250 MHz and 52,600 MHz). Communications in the FR2 band typically involves multiple beams (e.g., eight beams). As such, in support of the cell reselection procedure in the FR2 band, synchronization signal measurements may involve measurements on the different beams.

Furthermore, under certain conditions, the UE may be traveling at a high speed. As used herein, high speed refers to a speed that is larger than a speed threshold, such as fifty Kilometers per hour (Kph), one-hundred Kph, or some other value up to an upper bound such as five-hundred Kph. When traveling at the high speed, the UE may be operating in a high-speed mode. The high-speed mode is an operational mode that supports a travel speed of the UE larger than the speed threshold. The high-speed mode may also be referred to as a high speed train (HST) mode.

In the high-speed mode, the time needed to complete a cell reselection procedure is substantially reduced given the high speed nature of the UE's mobility. This time is even more reduced in an FR2 band given the millimeter wave (mmWave) nature of the communications. Hence, when the UE is operating in the high-speed mode using the FR2 band, completing the cell reselection procedure becomes more challenging relative to operations in non-high-speed mode (e.g., a low mobility mode) and/or non-FR2 band.

Embodiments of the present disclosure generally relate to, among other things, cell reselection and measurement by a UE operating in a high-speed mode and using an FR2 band. Stricter timing requirements to complete a cell reselection procedure by the UE (e.g., in the case of an idle mode or inactive mode) and/or to perform measurements and reporting by the UE to the network (e.g., in the case of the connected mode, where the network can select a cell for a handover) can be required. For example, cell reselection needs to be performed about every three seconds (or less). Within that overall time, specific time requirements for performing measurements on synchronization signals and/or evaluating cells can be defined. The time requirements can be based on the UE's beam sweeping capability. If the UE can support a reduced set of beams (e.g., less than eight, such as four), the UE can more quickly complete the cell reselection procedure such that a cell is identified within about every three seconds (or less).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "base station" as used herein refers to a device with radio communication capabilities, that is a network element of a communications network, and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refer to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100, in accordance with some embodiments. The network environment 100 may include a UE 104 and a gNB 108. The gNB 108 may be a base station that provides a wireless access cell, for example, a Third Generation Partnership Project (3GPP) New Radio (NR) cell, through which the UE 104 may communicate with the gNB 108. The UE 104 and the gNB 108 may communicate over an air interface compatible with 3GPP technical specifications such as those that define Fifth Generation (5G) NR system standards.

The gNB 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface. The physical channels may include a physical broadcast channel (PBCH), a physical downlink control channel (PDCCH), and a physical downlink shared channel (PDSCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure (including cell selection and reselection) and for beam selection.

The PDSCH may be used to transfer end-user application data, signaling radio bearer (SRB) messages, system information messages (other than, for example, MIB), and paging messages.

The PDCCH may transfer downlink control information (DCI) that is used by a scheduler of the gNB 108 to allocate both uplink and downlink resources. The DCI may also be used to provide uplink power control commands, configure a slot format, or indicate that preemption has occurred.

The gNB 108 may also transmit various reference signals to the UE 104. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel status information reference signals (CSI-RS). The CSI-RS may be a multi-purpose downlink transmission that may be used for CSI reporting, beam management, connected mode mobility, radio link failure detection, beam failure detection and recovery, and fine tuning of time and frequency synchronization.

The reference signals and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain and one orthogonal frequency division multiplexing (OFDM) symbol in the time domain. Twelve consecutive subcarriers in the frequency domain may compose a physical resource block (PRB). A resource element group (REG) may include one PRB in the frequency domain and one OFDM symbol in the time domain, for example, twelve resource elements. A control channel element (CCE) may represent a group of resources used to transmit PDCCH. One CCE may be mapped to a number of REGs, for example, six REGs.

Transmissions that use different antenna ports may experience different radio channels. However, in some situations, different antenna ports may share common radio channel characteristics. For example, different antenna ports may have similar Doppler shifts, Doppler spreads, average delay, delay spread, or spatial receive parameters (for example, properties associated with a downlink received signal angle of arrival at a UE). Antenna ports that share one or more of these large-scale radio channel characteristics may be said to be quasi co-located (QCL) with one another. 3GPP has specified four types of QCL to indicate which particular channel characteristics are shared. In QCL Type A, antenna ports share Doppler shift, Doppler spread, average delay, and delay spread. In QCL Type B, antenna ports share Doppler shift and Doppler spread. In QCL Type C, antenna ports share Doppler shift and average delay. In QCL Type D, antenna ports share spatial receiver parameters.

The gNB 108 may provide transmission configuration indicator (TCI) state information to the UE 104 to indicate QCL relationships between antenna ports used for reference signals (for example, synchronization signal/PBCH or CSI-RS) and downlink data or control signaling, for example, PDSCH or PDCCH. The gNB 108 may use a combination of RRC signaling, MAC control element signaling, and DCI to inform the UE 104 of these QCL relationships.

The UE 104 may transmit data and control information to the gNB 108 using physical uplink channels. Different types of physical uplink channels are possible including, for instance, a physical uplink control channel (PUCCH) and a physical uplink shared channel (PUSCH). Whereas the PUCCH carries control information from the UE 104 to the gNB 108, such as uplink control information (UCI), the PUSCH carries data traffic (e.g., end-user application data) and can carry UCI.

The UE 104 and the gNB 108 may perform beam management operations to identify and maintain desired beams for transmission in the uplink and downlink directions. The beam management may be applied to both PDSCH and PDCCH in the downlink direction, and PUSCH and PUCCH in the uplink direction.

In an example, communications with the gNB 108 and/or the base station can use channels in the frequency range 1 (FR1) band (between 40 Megahertz (MHz) and 7,125 MHz) and/or frequency range 2 (FR2) band (between 24,250 MHz and 52,600 MHz). The FR1 band includes a licensed band and an unlicensed band. The NR unlicensed band (NR-U) includes a frequency spectrum that is shared with other types of radio access technologies (RATs) (e.g., LTE-LAA, WiFi, etc.). A listen-before-talk (LBT) procedure can be used to avoid or minimize collision between the different RATs in the NR-U, whereby a device should applies a clear channel assessment (CCA) check before using the channel.

As further illustrated in FIG. 1, the network environment 100 may further include a base station 112 with which the UE 104 may also connect. The base station 112 supports the same RAT as the gNB 108 (e.g., the base station 112 is also a gNB). Additionally or alternatively, the base station 112 supports a different RAT (e.g., Long-Term Evolution (LTE) eNB).

In an example, the UE 104 supports carrier aggregation (CA), whereby the UE 104 can connect and exchange data simultaneously over multiple component carriers (CCs) with the gNB 108 and/or the base station 112. The CCs can belong to a same frequency band, in which case they are referred to as intra-band CCs. Intra-band CCs can be contiguous or non-contiguous. The CCs can also belong to different frequency bands, in which case they are referred to as inter-band CCs. A serving cell can be configured for the UE 104 to use a CC. A serving cell can be a primary (PCell) or primary secondary cell (PSCell). After a secondary cell (SCell). Multiple SCcells can be activated via SCell activation procedures where the component carriers of these serving cells can be intra-band contiguous, intra-band non-contiguous, or inter-band. The serving cells can be collocated or non-collocated.

Further, the UE 104 performs a cell reselection procedure to change cells (e.g., serving cells) after a UE is camped on (e.g., registered) a cell and stays in an idle mode or inactive mode. To do so, the UE 104 uses a set of cell reselection criteria including absolute priority, radio link quality, and cell accessibility. For example, after cell detection, cell selection, and cell registration, the UE 104 enters an idle mode if no communication traffic exists and received RRC-release message from the network. The UE 104 enters to the inactive mode if no communication traffic exists and received RRC-suspend message from the network. In any of these two modes, a cell reselection procedure can be performed. Per this procedure, the UE 104 measures synchronization signals including, for instance, synchronization signal reference signal received power (SS-RSRP) measurements and reference synchronization signal received quality (SS-RSRQ) measurements on PSSs and SSSs in SSBs. Further, the UE 104 can perform another cell detection if the measurements are poor or undetectable and, otherwise, evaluate the cell reselection criteria. If the cell reselection criteria are not met, the UE 104 remains camped on the current cell and does not select another cell. If the criteria are met, the UE 104 selects the best fitting cell and perform registration process to the this cell, thereby camping on it.

Figure 2:
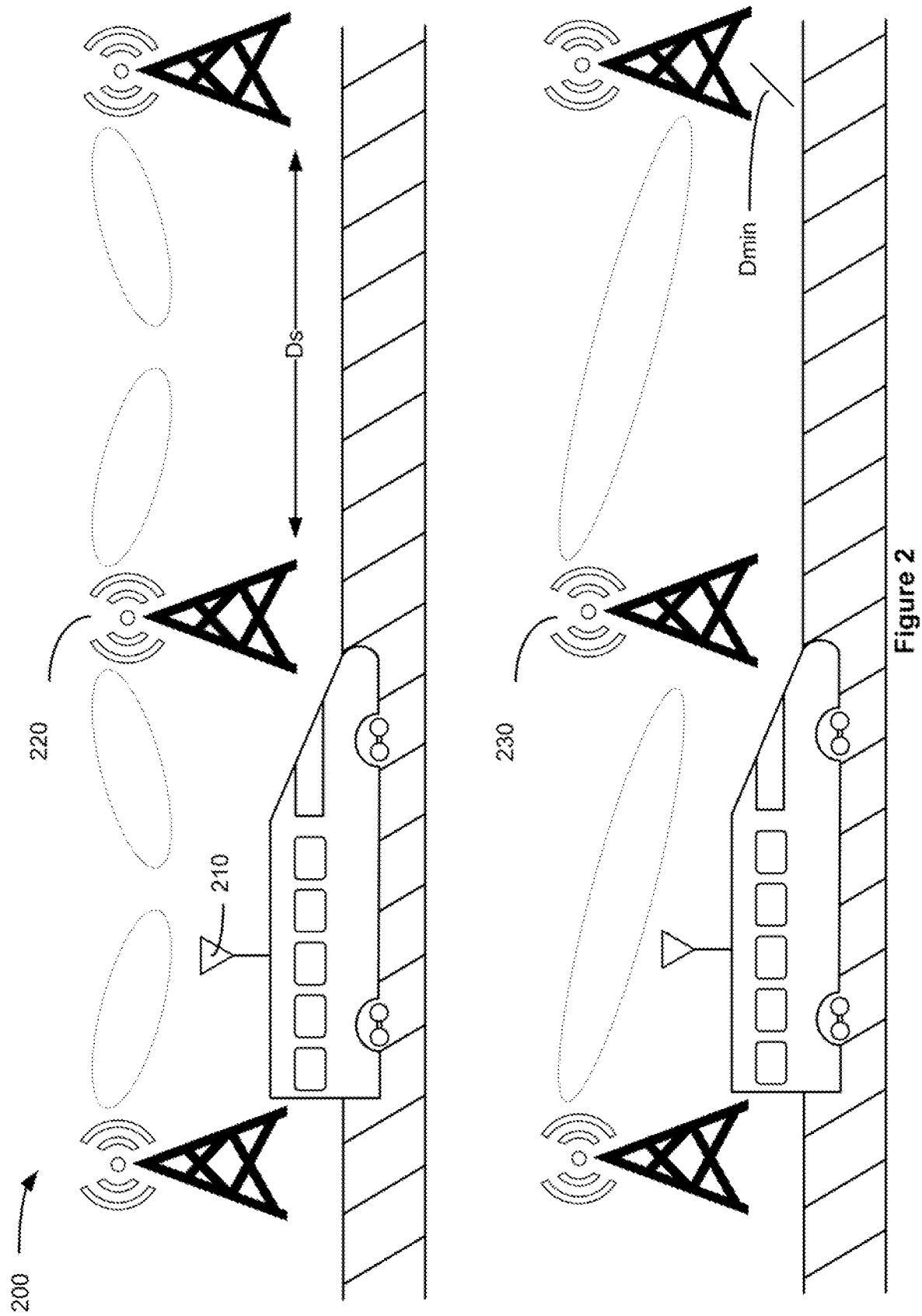
FIG. 2 illustrates an example of a high-speed mode of a user equipment (UE), in accordance with some embodiments.

FIG. 2 illustrates an example of a high-speed mode 200 of a UE 210, in accordance with some embodiments. In the high-speed mode 200, the UE 210 may be traveling at a speed that exceeds a speed threshold. In the illustration of FIG. 2, the high-speed mode 200 is a high speed train (HST) mode, shown with the train graphic. As the UE 210 travels, serving cells may become available and other serving cells may become unavailable, where the availability/unavailability depends on the UE's 210 travel speed.

Different configurations of the serving cells are possible. In one example, collocated cells are configured. Collocated cells refers to serving cells having coverage in a same geographic area. For example, the gnBs of these serving cells can be physically collocated or can be even one gNB. The collocated serving cells can use intra-band CCs and/or inter-band CCs. In another example, a non-collocated cell can be additionally or alternatively configured. The non-collocated cell refers to a serving cell that is not collocated with another serving cell. The non-collocated cell and the other serving cell can use intra-band CCs or inter-band CCs. In yet another example, an intra-band cell may be configured. The intra-band cell refers to a serving cell that uses a component carrier within a same frequency band of a component carrier of another configured serving cell. The intra-band cell and the other serving cell can be collocated or non-collocated. In a further another example, an inter-band cell may be configured. The inter-band cell refers to a serving cell that uses a component carrier within a different frequency band of a component carrier of another configured serving cell. The inter-band cell and the other serving cell can be collocated or non-collocated. Once the specific configuration is defined (e.g., via an RRC connection reconfiguration), the UE 210 can activate one or more of the configured serving cells.

In an example the UE 210 is a consumer premise equipment (CPE) mounted to a vehicle (e.g., on top of a train). The CPE can connect to the serving cells (e.g., the gNBs) using 5G RAT. The CPE can provide local connectivity to end user devices and/or internet of things (IoT) devices that are located in the vehicle (e.g., mobile phones of train passengers, telemetry devices of the train, etc.). The local connectivity can use 5G RAT (in which case the CPE acts like a repeater or relay) or a different RAT (e.g., WiFi). Of course, the UE 210 need not be limited to a CPE and can be a device of any type, where the device is capable of supporting one or more RATs including, for instance, 5G RAT.

In an example, the high-speed mode 200 is an operational mode of the UE 210 and can be available for FR1, FR2, and other applicable mmWave frequencies. Given the nature of FR2 bands, deployments and configuration of cells (or gNBs) are subject to the physical properties of the mmWaves. For example, the distance between gNBs (shown as "Ds" in FIG. 2) and the distance between a gNB and the pathway of the vehicle (e.g., the train track; shown as "Dmin" in FIG. 2) are much smaller than the corresponding distances used for FR1. Further, the RF radiation has a beam shape, rather than being in all directions as in FR1. As such, to cover different directions, beam management and controls are used. Table 1 below summarizes possible deployment scenarios. Scenarios "2" and "4" are considered by the 3GPP standard body as high priority. Along with these scenarios, bidirectional single frequency networks (SFNs) 220 and unidirectional SFNs 230 are also possible. The FR2 frequency used for the high speed mode can be, in an example, up to 30 GHz with candidate bands including band n261, n257, and n258. The deployment can use multiple remote radio heads (multi-RHHs) in a gNB, where the rHHs share the same cell identifier (e.g., a physical cell ID). The UE 210 can have a power class of "2", "3", or "4" and can support cell reselection in a connected mode (e.g., exchanging traffic), idle mode, or inactive mode, while also being in the high speed mode 200.

TABLE 1

| Scenario | Ds (meter) | Dmin (meter) |
|---|---|---|
| 1 | 800 | 10 |
| 2 | 650 | 10 |
| 3 | 500 | 10 |
| 4 | 300 | 50 |
| 5 | 200 | 30 |

In an example, scenario "4" above is deployed with a travel speed of three-hundred fifty kilometers per hour. In this deployment, the UE 210 physically travels between two gNBs (e.g., a first gN and a second gNB) in about three seconds. This type of physical mobility very likely results in the first gNB initially having a better cell coverage and second gNB having quickly thereafter the better cell coverage. Accordingly, the UE 210 needs to complete the cell reselection procedure in less than three seconds such that the UE 210 can camp on the next gNB along the travel pathway every three seconds or so. A further description of this time requirement is provided in the next figure.

Figure 3:
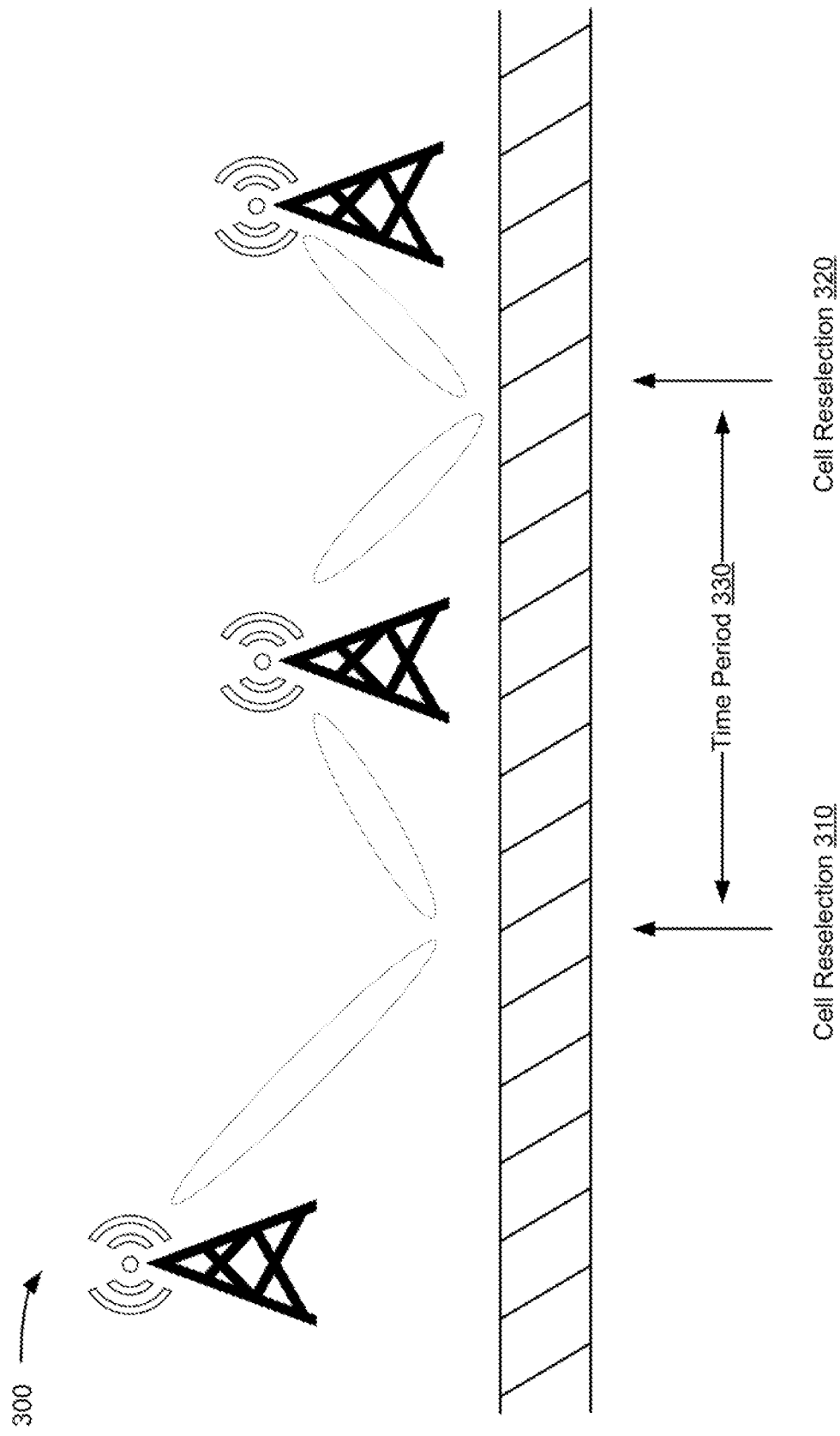
FIG. 3 illustrates an example of a timing requirement for cell reselection by a UE operating in a high-speed mode, in accordance with some embodiments.

FIG. 3 illustrates an example of a timing requirement 300 for cell reselection by a UE operating in a high-speed mode, in accordance with some embodiments. Here, for illustrative purposes, a bidirectional SFN is shown. However, the embodiments similarly apply to the unidirectional SFN. In particular, the absolute value of the timing requirement 300 may be the same in both types of networks. One difference relates to the location where a cell reselection is completed. In the case of the unidirectional SFN, this location is typically closer to ta gNB, whereas for the bidirectional SFN, the location is typically in between two gNBs.

In an example, different gNBs are deployed along the vehicle pathway. For instance, the deployment meets one or more of the scenarios of Table 1. Further, different serving cells can be supported using intra-band cells and/or inter-band cells that can be collocated and/or non-collocated. In FR2, beamforming is used, whereby a gNB changes the direction of a transmit (Tx) beam at a particular rate (e.g., to achieve particular Tx beamforming) and a UE changes the direction of its receive beam (Rx) at a particular rate too (e.g., to achieve particular Rx beam sweeping). Likewise, the UE changes the direction of its Tx beam and the gNB changes the direction of its Rx beam. In the case of cell reselection, the UE performs measurements on synchronization signals along the receive path and, thus, for the purpose of the present disclosure, the description herein below is focused on the UE's Rx beam sweeping.

In the illustration of FIG. 3, the gNBs may, but need not, have a similar geographical distribution (e.g., different distances between the gNBs may exist and/or different distances between the gNBs and the vehicle pathway may exist). Hence, the point at which cell reselection needs to be completed can vary along the vehicle pathway (e.g., this point does not need to be around the center on the pathway between two gNBs). A UE is traveling in a direction (in the illustration of FIG. 3, the direction is from left to right). As the UE moves away from a first gNB and approaches a second gNB, a cell first reselection 310 happens at a point between these two gNBs, where the cell provided by the second gNB is selected based on measurements of synchronization signals of the two gNBs. Assume that the timing of the first cell reselection 310 is $t_0$. The UE continues traveling in the same direction and starts moving away from the second gNB and approaching a third gNB. Here also, a second cell reselection 310 happens at a point between the second gnB and the third gNB depending on synchronization signal measurements. Assume that the timing of the second cell reselection 330 is $t_1$. The difference between the two timings (e.g., "$t_1$-$t_0$") represents a time period 330. Depending on the deployment selection, specific FR2 configuration, and travel speed, an upper bound can be defined for the time period 330. This upper bound represents a maximum time period within which a cell reselection procedure needs to be completed. For instance, and referring back to the above scenario "4" example, the time period 330 needs to be less than seconds. Accordingly, a timing requirement can be defined (e.g., in a 3GPP technical standard (TS)) that sets the maximum time period. This requirement can be applicable to all scenarios, frequency bands, and travel speeds or can be more granular by being specific to a deployment scenario, a frequency band, and/or travel speed.

Figure 4:
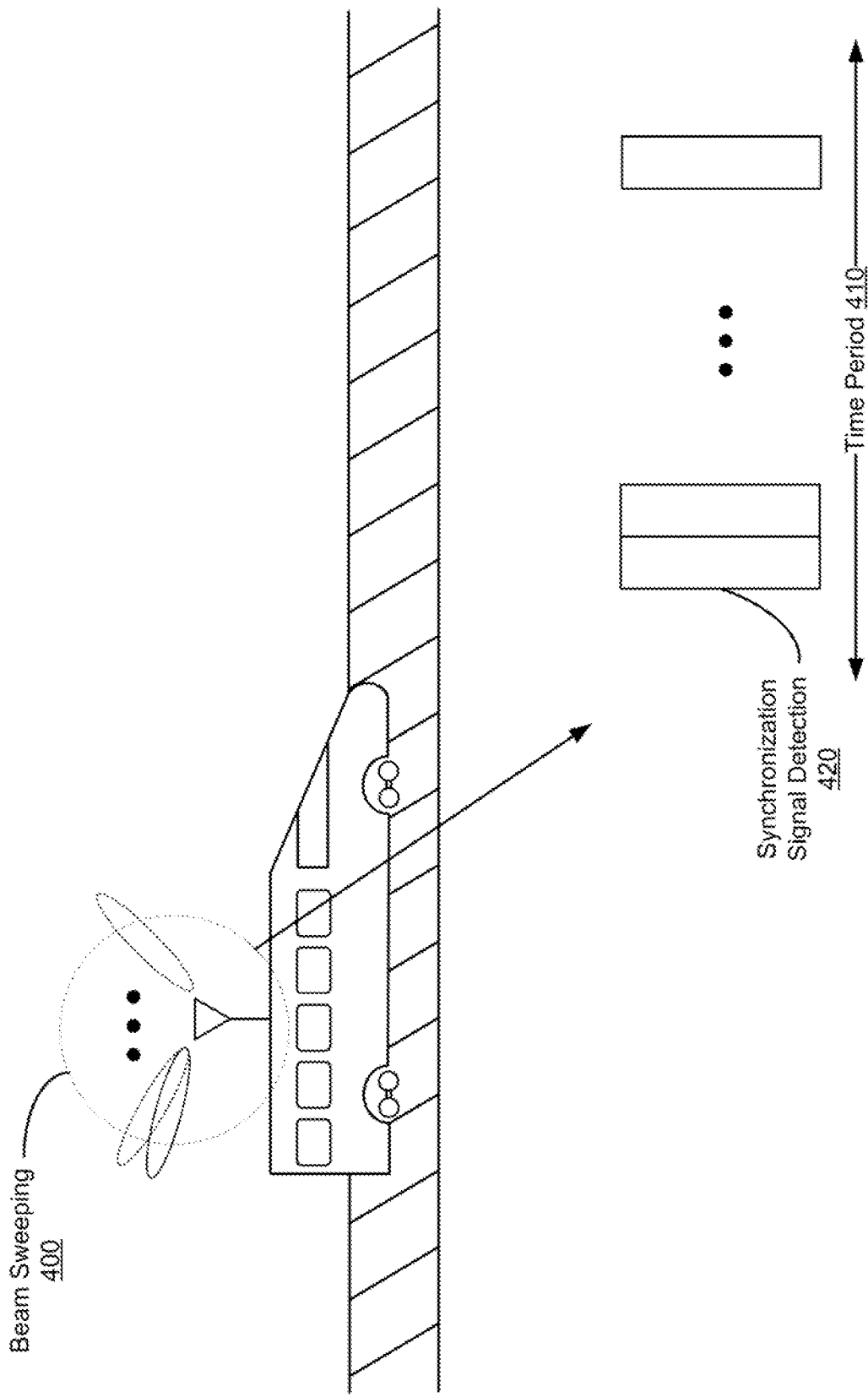
FIG. 4 illustrates an example of beam sweeping by a UE to support cell reselection in a high-speed mode, in accordance with some embodiments.

FIG. 4 illustrates an example of beam sweeping 400 by a UE to support cell reselection in a high-speed mode, in accordance with some embodiments. The UE has the capability of supporting a maximum number of beams. Typically, this maximum is eight and this maximum number is used herein forward as an illustrative example. Further, for cell reselection, the UE can have a beam sweeping capability of using a reduced set of beams for the beam sweeping 400, where this reduced set is smaller than the maximum. For instance, the UE can support, one, two, four, six or any other number of beams smaller than eight. In other words, rather than having to perform measurements on eight receive beams within a beam sweep, it is sufficient for the UE to perform, for example, four measurements (or whatever the beam sweeping capability is) on four receive beams in the beam sweep, where the four beams carry synchronization signals, such as SSBs transmitted by a gNB, and where the four measurements are sufficient to properly or accurately evaluate the cell reselection criteria and decide whether to camp on another cell or not. Accordingly, this beam sweeping capability is a capability that reduces the number of needed beams to properly complete the cell reselection procedure.

As explained herein above, a maximum time period within which a cell reselection procedure is to be complete can be defined for the high speed mode and FR2. The UE needs to detect the synchronization signals and complete its evaluation within that maximum time period (e.g., three seconds). The actual time period 410 that the UE has is smaller or equal to the maximum time period and can depend on a discontinuous reception (DRX) cycle length, the UE's beam sweeping capability, and whether the UE is in the idle mode/inactive mode or in the connected mode. The DRX cycle length indicates an on duration during which the UE can receive and detect synchronization signals 420. The beam sweeping capability can indicate how many of these synchronization signals are to be detected and measured. The idle mode/inactive mode and the connected mode can indicate the type of synchronization signals, the type of measurements, and, in the case of the connected mode, the type of measurement reports back to a gNB. Generally, values for the actual time period 410 and specific types of synchronization signals measurements (and, as applicable, reporting) for different DRX cycle lengths are defined in a non-high speed mode in sections 4.1 (for idle mode), 5.2 (for inactive mode), 9 (for measurement procedures in the connected mode, including for a handover, of 3GPP TS 38.133 V16.5.0 (Oct. 9, 2020), the contents of which are hereby incorporated by reference. For example, in the idle mode and inactive mode, SSBs are used to measure RSRPs and RSRQs. In the connected mode, detection is performed on PSS and SSS of SSBs with measurement gaps or without measurement gaps for inter-frequency or intra-frequency cell detection. In also the connected mode, layer 1 signal-to-interference and noise ratio (L1-SINR) reporting can be performed with SSB or CSI-RS based channel measurement resource (CMR) and dedicated interference measurement (IMR). Timing requirements for these different types of measurements and/or detections are defined except that no such definitions have been made yet for FR2 in high speed mode. Also no such definitions have been made yet to account for the UE beam sweeping capability.

In the interest of clarity of explanation, a description of timing requirements for FR2 in a high speed mode and idle mode is provided in the next figure, where the timing requirements are based on the UE's beam sweeping capability. Nonetheless, the timing requirements can be similarly defined for the inactive mode and the connected mode also based on the UE's beam sweeping capability, where the specific type of timing requirement (e.g., a time period for PSS/SSS detection versus a measurement period of intra-frequency measurements without gaps) depends on the mode. For the connected mode, the timing requirements relate to, for instance, detecting synchronization signals, performing measurements on such signals, and/or reporting to the network (e.g., to a gNB), where the network may select the next cell and initiate a handover. Generally, to meet the shorter time period for actually completing a cell reselection procedure (which is performed by the UE in the case of the idle mode or inactive mode, or distributed between the UE and the gNB in the case of the connected mode where this procedure is a handover procedure), the timing requirements are also made shorter and their lengths can depend on the beam sweeping capability (e.g., the more advanced the beam sweeping capability—the more reduced the set of beams is—the shorter the timing requirements can become).

FIG. 5 illustrates examples of timing requirements for cell reselection by a UE operating in a high-speed mode and in an idle mode, in accordance with some embodiments. In the idle mode, a UE can be required to perform intra-frequency cell measurements and intra-cell evaluations (illustrated in the figure with blank rectangles and diagonally shaded rectangles, respectively). In particular, within every measurement period "$T_{measure,NR\_Intra}$," the UE is required to measure SS-RSRP and SS-RSRQ. The synchronization signal SS can be a PSS or an SSS of an SSB. Further, for an intra-frequency cell that has been already detected, but that has not been reselected, the UE is required to evaluate whether the intra-frequency cell has met reselection criteria within an evaluation time period "$T_{evaluate,NR\_Intra}$." The total number of measurements "X" and the total number of evaluations "Y" results in a detection period "$T_{detect,NR\_Intra}$", where "$T_{detect,NR\_Intra}$=X*$T_{measure,NR\_Intra}$+Y*$T_{evaluate,NR\_Intra}$." In the upper portion of FIG. 5, a first detection period 510 is shown with "X=5" (corresponding to five times a measurement period 512 or, equivalently, five measurements of SSR-RSRP and SS-RSRQ) and "Y=3" (corresponding to three times an evaluation period 514 or, equivalently, three intra-frequency cell evaluations). In the lower portion of FIG. 5, a second detection period 520 is shown and is shorter than the first detection period 510, where "X=3" (corresponding to three times a measurement period 522 having the same length as the measurement period 512 or, equivalently, three measurements of SSR-RSRP and SS-RSRQ) and "Y=1" (corresponding to one time an evaluation period 524 having the same length as the evaluation period 514 or, equivalently, one intra-frequency cell evaluation).

In an illustration of these time periods, consider an example where the DRX cycle length is twenty milliseconds and the SSB periodicity is also twenty milliseconds. In this example, the UE sweeping capability "N" is eight. As such, the UE can derive the required RRSP and RSRQ measurements from SSBs by using eight Rx beams, each carrying an SSB. Hence, the measurement period is equal to eight times the SSB periodicity ("$T_{measure,NR\_Intra}$=160 ms"). If the UE performs five measurements (e.g., over five DRX cycles), this results in eight-hundred milliseconds of measurements. Also in this example, to perform an intra-cell evaluation, evaluation of three measurements (e.g., over three DRX cycles) on Rx beams of that cell is used, resulting in an evaluation period of four-hundred and eighty milliseconds. In total, the UE can complete the cell reselection within 1.28 seconds (e.g., the detection period 510 is equal to 1.28 seconds, and meets the three second overall timing requirement). In another example, the UE sweeping capability "N" is four. In this example, the resulting detection period 510 becomes equal to 0.64 seconds. In yet variations of these two examples, rather than using five measurements and three DRX cycles-based evaluation, three measurements and one DRX cycle-based evaluation are used. When the UE sweeping capability "N" is equal to eight, the detection period 520 is equal to 0.64 seconds. In comparison, when the UE sweeping capability "N" is four, this detection period 520 is reduced to 0.32 seconds. Thus, depending on the UE sweeping capability "N" and how many measurements and DRX cycles are used per evaluation, the overall time to complete a cell reselection procedure can be reduced, which in turn signifies that longer DRX cycles can be used (e.g., with longer cycle lengths) to improve the power consumption of the UE.

Accordingly, timing requirements can be defined for the UE, where the definitions can be based on the UE beam sweeping capability "N." Generally, the smaller "N" is, the shorter the time periods can be. Table 2 below illustrates an example of the timing requirements, with "X" equal to eight and "Y" equal to three. Table 3 illustrates another example with "X" equal to three and "Y" equal to one. Of course other variations are possible, where each of "X" and "Y" can be equal to at least one. Further, such tables can be combined. Table 4 illustrates a combination of Table 2 and Table 3, and includes specific timing values. DRX cycles longer than 0.32 seconds may be removed and not used because the overall timing requirement (e.g., about three seconds of scenario "4") may not be met in such situations.

TABLE 2

| DRX Cycle Length [seconds] | $T_{detect, NR\_Intra}$ [seconds] (number of DRX cycles) | $T_{measure, NR\_Intra}$ [seconds] (number of DRX cycles) | $T_{evaluate, NR\_Intra}$ [Seconds] (number of DRX cycles) |
|---|---|---|---|
| 0.02 | 0.16*N (8*N) | 0.02*N (1*N) | 0.06*N (3*N) |
| 0.04 | 0.32*N (8*N) | 0.04*N (1*N) | 0.12*N (3*N) |
| 0.08 | 0.64*N (8*N) | 0.08*N (1*N) | 0.24*N (3*N) |
| 0.16 | 1.28*N (8*N) | 0.16*N (1*N) | 0.48*N (3*N) |
| 0.32 | 2.56*N (8*N) | 0.32*N (1*N) | 0.96*N (3*N) |

TABLE 3

| DRX Cycle Length [seconds] | $T_{detect, NR\_Intra}$ [seconds] (number of DRX cycles) | $T_{measure, NR\_Intra}$ [seconds] (number of DRX cycles) | $T_{evaluate, NR\_Intra}$ [Seconds] (number of DRX cycles) |
|---|---|---|---|
| 0.02 | 0.08*N (4*N) | 0.02*N (1*N) | 0.02*N (1*N) |
| 0.04 | 0.16*N (4*N) | 0.04*N (1*N) | 0.04*N (1*N) |
| 0.08 | 0.32*N (4*N) | 0.08*N (1*N) | 0.08*N (1*N) |
| 0.16 | 0.64*N (4*N) | 0.16*N (1*N) | 0.16*N (1*N) |
| 0.32 | 1.28*N (4*N) | 0.32*N (1*N) | 0.32*N (1*N) |

In the above two tables, each row corresponds to DRX cycle length in seconds. The columns identify $T_{detect,NR\_Intra}$, $T_{measure,NR\_Intra}$, and $T_{evaluate,NR\_Intra}$ in seconds as a function of the UE beam sweeping capability "N" (here, the multiplier depends on the DRX cycle length) and in the number of DRX cycles as a function of the UE beam sweeping capability "N".

To illustrate and referring to Table 2 and DRX cycle of 0.02 seconds, consider a first example where the UE beam sweeping capability "N" is equal to eight. In this case, the UE determines from Table 2 (e.g., from its program logic that stores this table or an equivalent data structure) that $T_{detect,NR\_Intra}$, $T_{measure,NR\_Intra}$, and $T_{evaluate,NR\_Intra}$ are equal to 1.28 seconds, 0.16 seconds (per measurement of eight beams), and 0.48 seconds (for all three evaluations). The UE can determine that its total measurement time is 0.8 seconds (e.g., "1.28-0.48"). Given the 0.16 seconds per measurement of eight beams, the UE can determine that it can perform five measurements (e.g., of eight beams each) during the 0.8 seconds and yet still meet the overall time needed to complete cell reselection (e.g., about three seconds for scenario "4").

In another illustration and referring to Table 3 with a longer DRX cycle of 0.32 seconds, consider a second example where the UE beam sweeping capability "N" is equal to two. In this case, the UE determines from Table 3 (e.g., from its program logic that stores this table or an equivalent data structure) that $T_{detect,NR\_Intra}$, $T_{measure,NR\_Intra}$, and $T_{evaluate,NR\_Intra}$ are equal to 2.56 seconds, 0.64 seconds (per measurement of two beams), and 0.64 seconds (for one evaluation). The UE can determine that its total measurement time is 1.92 seconds (e.g., "2.56-0.64"). Given the 0.64 seconds per measurement of two beams, the UE can determine that it can perform three measurements (e.g., of two beams each) during the 1.92 seconds and yet still meet the overall time needed to complete cell reselection (e.g., about three seconds for scenario "4").

In this second example, the configuration of Table 2 would not be useful because $T_{detect,NR\_Intra}$ would be equal to 5.12 seconds and is longer than the needed overall time. For this reason, the UE may instead rely on the configuration of Table 3. Of course, which table to use and specific timing configuration therein can depend on the DRX cycle length and the UE beam sweeping capability "N". Given the DRX cycle configuration (as indicated by the gNB in RRC signaling) and the UE beam sweeping capability "N", the UE can determine from these tables which timing configuration (e.g., which $T_{detect,NR\_Intra}$) would meet the needed overall time for the cell reselection and use this timing configuration.

The above tables are useful in the FR2 high-speed mode, when the UE is also operating in an idle mode (or in an active mode) and intra-frequency measurements are measured. On the other hand, inter-frequency measurements and inter-cell evaluations may be considered. On approach is to limit the cell reselection to intra-frequency cells in the FR2 high speed mode and idle mode (or inactive mode), where inter-frequency measurements and inter-cell evaluations are prohibited. In another approach, inter-frequency measurements and inter-cell evaluations are allowed for the FR2 high speed mode and idle mode (or inactive mode). However, certain limitations may be imposed. In one example limitation, higher priority layer relaxation may not be allowed. In particular, for non-high speed, a relaxation time period of sixty seconds may be allowed when the UE is in proximity to a gNB and is in low mobility. This relaxation time period indicates that its sufficient for the UE to perform inter-frequency measurements and inter-cell evaluations every sixty seconds. In contrast, this relaxation time period can be either reduced (e.g., to less than three seconds) or not allowed for the high speed mode. In another example limitation, thresholds used to compare measurements in order to determine whether cell reselection criteria are met can be made higher for inter-frequency measurements in the FR2 high speed mode. For instance, a first threshold (S_nonIntraSearchP) is compared to SS-RSRP measurements, and a second threshold (S_nonIntraSearchQ) is compared to SS-RSRQ measurements. When an SS-RSRP measurement exceeds the first threshold and an SS-RSRQ measurement exceeds the second threshold for an inter-frequency synchronization signal, the cell reselection criteria are evaluated. In this example limitation, the first threshold and the second threshold are defined to have higher values for the FR2 high speed mode relative to the FR2 or FR1 non-high speed mode. Effectively, by increasing the two thresholds, the inter-cell evaluation and resulting cell reselection is performed less often.

As explained above, Table 2 and Table 3 are useful in the FR2 high-speed mode, when the UE is also operating in an idle mode (or in an active mode) and intra-frequency measurements are measured. Similar timing requirements can be defined for the FR2 high-speed mode, when the UE is also operating in a connected mode. The timing requirements can also be based on the UE beam sweeping capability "N", where the smaller "N" is, the shorter the timing requirements can be. The specific timing requirement, referred to herein below as a time period or a detection period, can depend on the type of signal used and whether intra-frequency measurements or inter-frequency measurements are needed. The examples below describe the different variations for the FR2 high-speed mode, when the UE is also operating in the connected mode.

In a first example of the FR2 high-speed mode, when the UE is also operating in the connected mode, a time period for PSS/SSS detection for intra-frequency measurements without gaps is used. Table 4 below shows this time period.

TABLE 4

| DRX cycle | $T_{PSS/SSS\_sync\_intra}$ |
|---|---|
| No DRX | max(600 ms, ceil($M_{pss/sss\_sync\_w/o\_gaps}$ * $K_p$ * $K_{layer1\_measurement}$) * SMTC period) * $CSSF_{intra}$ |
| DRX cycle ≤ 320 ms | max(600 ms, ceil(1.5 * $M_{pss/sss\_sync\_w/o\_gaps}$ * $K_p$ x $K_{layer1\_measurement}$) * max(SMTC period, DRX cycle)) * $CSSF_{intra}$ |
| DRX cycle > 320 ms | ceil($M_{pss/sss\_sync\_w/o\_gaps}$ * Kp * $K_{layer1\_measurement}$) * DRX cycle * $CSSF_{intra}$ |

"$M_{pss/sss\_sync\_w/o\_gaps}$" represents the sample number of L1 filtering. This number can be set based on the UE beam sweeping capability "N". For example, "$M_{pss/sss\_sync\_w/o\_gaps}$" can be set to be a multiplier of "N" (e.g., "$M_{pss/sss\_sync\_w/o\_gaps}$=3*N", such that "$M_{pss/sss\_sync\_w/o\_gaps}$=24" for "N=8" or "$M_{pss/sss\_sync\_w/o\_gaps}$=12" for "N=4"). Doing so allows reducing the duration of $T_{PSS/SSS\_sync\_intra}$ (e.g., allows a faster detection period).

Additional or alternative variations may be used and may not directly depend on the UE beam sweeping capability "N". These variations can be implemented to reduce the duration of $T_{PSS/SSS\_sync\_intra}$ (e.g., for a faster detection period). In a first illustration, the multiplier used (three in the above example) can be reduced (e.g., to two or three, such that "$M_{pss/sss\_sync\_w/o\_gaps}$=2*N", or "$M_{pss/sss\_sync\_w/o\_gaps}$=1*N"). In a second illustration, $M_{pss/sss\_sync\_w/o\_gaps}$ can be reduced to a smaller value for a certain combination of DRX cycle length and SMTC period. Generally, an SMTC period of less than forty milliseconds is used for the high speed mode. Accordingly a combination here can be for a DRX cycle shorter than three-hundred and twenty milliseconds and an SMTC period shorter than forty milliseconds. In a third illustration, the scaling factor of "1.5" in the above table can be reduced (e.g., to "1" or another value smaller than "1.5") for the DRX cycle shorter than three-hundred and twenty milliseconds and/or for the SMTC period shorter than forty milliseconds. In a fourth illustration, the fixed value of "600 ms" can be reduced to a smaller value, such as three-hundred milliseconds. In a fifth illustration, the network configuration (e.g., as set via RRC signaling) can ensure that "$K_p$=1", "$K_{layer1\_measurement}$=1" and "$CSSF_{intra}$=1".

In a second example of the FR2 high-speed mode, when the UE is also operating in the connected mode, a measurement period for intra-frequency measurements without gaps is used. Table 5 below shows this time period.

TABLE 5

| DRX cycle | $T_{SSB\_measurement\_period\_intra}$ |
|---|---|
| No DRX | max(400 ms, ceil($M_{meas\_period\_w/o\_gaps}$ * $K_p$ * $K_{layer1\_measurement}$) x SMTC period) * $CSSF_{intra}$ |

TABLE 5-continued

| DRX cycle | $T_{SSB\_measurement\_period\_intra}$ |
|---|---|
| DRX cycle ≤ 320 ms | max(400 ms, ceil(1.5 * $M_{meas\_period\_w/o\_gaps}$ * $K_p$ * $K_{layer1\_measurement}$) * max(SMTC period, DRX cycle)) * $CSSF_{intra}$ |
| DRX cycle > 320 ms | ceil($M_{meas\_period\_w/o\_gaps}$ * $K_p$ * $K_{layer1\_measurement}$) * DRX cycle * $CSSF_{intra}$ |

"$M_{meas\_period\_w/o\_gaps}$" represents the sample number of L1 filtering. This number can be set based on the UE beam sweeping capability "N". For example, "$M_{meas\_period\_w/o\_gaps}$" can be set to be a multiplier of "N" (e.g., "$M_{meas\_period\_w/o\_gaps}$=3*N", such that "$M_{meas\_period\_w/o\_gaps}$=24" for "N=8" or "$M_{meas\_period\_w/o\_gaps}$=12" for "N=4"). Doing so allows reducing the duration of $T_{SSB\_measurement\_period\_intra}$ (e.g., allows a faster detection period).

Additional or alternative variations may be used and may not directly depend on the UE beam sweeping capability "N". These variations can be implemented to reduce the duration of $T_{SSB\_measurement\_period\_intra}$ (e.g., for a faster detection period). In a first illustration, the multiplier used (three in the above example) can be reduced (e.g., to two or three, such that "$M_{meas\_period\_w/o\_gaps}$=2*N", or "$M_{meas\_period\_w/o\_gaps}$=1*N"). In a second illustration, $M_{meas\_period\_w/o\_gaps}$ can be reduced to a smaller value for a certain combination of DRX cycle length and SMTC period. A combination here can be for a DRX cycle shorter than three-hundred and twenty milliseconds and an SMTC period shorter than forty milliseconds. In a third illustration, the scaling factor of "1.5" in the above table can be reduced (e.g., to "1" or another value smaller than "1.5") for the DRX cycle shorter than three-hundred and twenty milliseconds and/or for the SMTC period shorter than forty milliseconds. In a fourth illustration, the fixed value of "400 ms" can be reduced to a smaller value, such as two-hundred milliseconds. In a fifth illustration, the network configuration (e.g., as set via RRC signaling) can ensure that "$K_p$=1", "$K_{layer1\_measurement}$=1" and "$CSSF_{intra}$=1".

The above approaches to $T_{SSB\_measurement\_period\_intra}$ can be captured in another table (Table 6 below). The UE can implement this table (e.g., store this table or an equivalent data structure in memory for use by its program code).

TABLE 6

| DRX cycle | $T_{SSB\_measurement\_period\_intra}$ |
|---|---|
| No DRX | max(400 ms, ceil($M_{meas\_period\_w/o\_gaps}$ * $K_p$ * $K_{layer1\_measurement}$) * SMTC period) * $CSSF_{intra}$ |
| DRX cycle ≤ 160 ms | max(400 ms, ceil($M_{meas\_period\_w/o\_gaps}$ * $M_2$ * $K_p$ * $K_{layer1\_measurement}$) * max(SMTC period, DRX cycle)) $CSSF_{intra}$ |
| 160 ms < DRX cycle ≤ 320 ms | max(400 ms, ceil($M_{meas\_period\_w/o\_gaps}$ * $M_2$ * $K_p$ * $K_{layer1\_measurement}$) * max(SMTC period, DRX cycle)) * $CSSF_{intra}$ |
| DRX cycle > 320 ms | max(400 ms, ceil(Y * $K_p$ * $K_{layer1\_measurement}$) * max(SMTC period, DRX cycle)) * $CSSF_{intra}$ |

"$M_2$" can be set to a value less than "1.5" for the FR2 high-speed mode, and to "1.5" otherwise (e.g., "$M_2$=1.5" if "SMTC period>40 ms", otherwise "$M_2$=1"). "Y" can be decreased for the FR2 high-speed mode such as by being set to "8" or "16" when the SMTC period is less than forty milliseconds, and to a higher value otherwise (e.g., "Y=24" if "SMTS>40 ms", otherwise "Y=8 or 16").

In a third example of the FR2 high-speed mode, when the UE is also operating in the connected mode, a time period for PSS/SSS detection for intra-frequency measurements with gaps is used. Table 7 below shows this time period.

TABLE 7

| DRX cycle | $T_{PSS/SSS\_sync\_intra}$ |
|---|---|
| No DRX | max(600 ms, $M_{pss/sss\_sync\_with\_gaps}$ * max (MGRP, SMTC period)) * $CSSF_{intra}$ |
| DRX cycle ≤ 320 ms | max(600 ms, ceil(1.5x $M_{pss/sss\_sync\_with\_gaps}$) * max(MGRP, SMTC period, DRX cycle)) * $CSSF_{intra}$ |
| DRX cycle > 320 ms | $M_{pss/sss\_sync\_with\_gaps}$ * max(MGRP, DRX cycle) * $CSSF_{intra}$ |

"$M_{pss/sss\_sync\_with\_gaps}$" represents the sample number of L1 filtering. This number can be set based on the UE beam sweeping capability "N". For example, "$M_{pss/sss\_sync\_with\_gaps}$" can be set to be a multiplier of "N" (e.g., "$M_{pss/sss\_sync\_with\_gaps}$=3*N", such that "$M_{pss/sss\_sync\_with\_gaps}$=24" for "N=8" or "$M_{pss/sss\_sync\_with\_gaps}$=12" for "N=4"). Doing so allows reducing the duration of $T_{PSS/SSS\_sync\_intra}$ (e.g., allows a faster detection period).

Additional or alternative variations may be used and may not directly depend on the UE beam sweeping capability "N". These variations can be implemented to reduce the duration of $T_{PSS/SSS\_sync\_intra}$ (e.g., for a faster detection period). In a first illustration, the multiplier used (three in the above example) can be reduced (e.g., to two or three, such that "$M_{pss/sss\_sync\_with\_gaps}$=2*N", or "$M_{pss/sss\_sync\_with\_gaps}$=1*N"). In a second illustration, $M_{pss/sss\_sync\_with\_gaps}$ can be reduced to a smaller value for a certain combination of DRX cycle length and SMTC period. A combination here can be for a DRX cycle shorter than three-hundred and twenty milliseconds and an SMTC period shorter than forty milliseconds. In a third illustration, the scaling factor of "1.5" in the above table can be reduced (e.g., to "1" or another value smaller than "1.5") for the DRX cycle shorter than three-hundred and twenty milliseconds and/or for the SMTC period shorter than forty milliseconds. In a fourth illustration, the fixed value of "600 ms" can be reduced to a smaller value, such as three-hundred milliseconds. In a fifth illustration, the network configuration (e.g., as set via RRC signaling) can ensure that "$K_p$=1", "$K_{layer1\_measurement}$=1" and "$CSSF_{intra}$=1".

In a fourth example of the FR2 high-speed mode, when the UE is also operating in the connected mode, a measurement period for intra-frequency measurements with gaps is used. Table 8 below shows this time period.

TABLE 8

| DRX cycle | $T_{SSB\_measurement\_period\_intra}$ |
|---|---|
| No DRX | max(400 ms, $M_{meas\_period\ with\_gaps}$ * max (MGRP, SMTC period)) * $CSSF_{intra}$ |
| DRX cycle ≤ 320 ms | max(400 ms, ceil(1.5 * $M_{meas\_period\ with\_gaps}$) * max(MGRP, SMTC period, DRX cycle)) * $CSSF_{intra}$ |
| DRX cycle > 320 ms | $M_{meas\_period\ with\_gaps}$ * max(MGRP, DRX cycle) * $CSSF_{intra}$ |

"$M_{meas\_period\ with\_gaps}$" represents the sample number of L1 filtering. This number can be set based on the UE beam sweeping capability "N". For example, "$M_{meas\_period\ with\_gaps}$" can be set to be a multiplier of "N" (e.g., "$M_{meas\_period\ with\_gaps}$=3*N", such that "$M_{meas\_period\ with\_gaps}$=24" for "N=8" or "$M_{meas\_period\ with\_gaps}$=12" for "N=4"). Doing so allows reducing the duration of $T_{SSB\_measurement\_period\_intra}$ (e.g., allows a faster detection period).

Additional or alternative variations may be used and may not directly depend on the UE beam sweeping capability "N". These variations can be implemented to reduce the duration of $T_{SSB\_measurement\_period\_intra}$ (e.g., for a faster detection period). In a first illustration, the multiplier used (three in the above example) can be reduced (e.g., to two or three, such that "$M_{meas\_period\ with\_gaps}=2*N$", or "$M_{meas\_period\ with\_gaps}=1*N$"). In a second illustration, $M_{meas\_period\ with\_gaps}$ can be reduced to a smaller value for a certain combination of DRX cycle length and SMTC period. A combination here can be for a DRX cycle shorter than three-hundred and twenty milliseconds and an SMTC period shorter than forty milliseconds. In a third illustration, the scaling factor of "1.5" in the above table can be reduced (e.g., to "1" or another value smaller than "1.5") for the DRX cycle shorter than three-hundred and twenty milliseconds and/or for the SMTC period shorter than forty milliseconds. In a fourth illustration, the fixed value of "400 ms" can be reduced to a smaller value, such as two-hundred milliseconds. In a fifth illustration, the network configuration (e.g., as set via RRC signaling) can ensure that "$K_p=1$", "$K_{layer1\_measurement}=1$" and "$CSSF_{intra}=1$".

The above approaches to $T_{SSB\_measurement\_period\_intra}$ can be captured in another table (Table 9 below). The UE can implement this table (e.g., store this table or an equivalent data structure in memory for use by its program code).

TABLE 9

| DRX cycle | $T_{SSB\_measurement\_period\_intra}$ |
| --- | --- |
| No DRX | max(400 ms, ceil($M_{meas\_period\_with\_gaps}$ * $K_p$ * $K_{layer1\_measurement}$) * max(MGRP, SMTC period) * $CSSF_{intra}$ |
| DRX cycle ≤ 160 ms | max(400 ms, ceil($M_{meas\_period\_with\_gaps}$ * $M_2$ * $K_p$ * $K_{layer1\_measurement}$) * max(MGRP, SMTC period, DRX cycle)) * $CSSF_{intra}$ |
| 160 ms < DRX cycle ≤ 320 ms | max(400 ms, ceil($M_{meas\_period\_with\_gaps}$ * $M_2$ * $K_p$ * $K_{layer1\_measurement}$) * max(MGRP, SMTC period, DRX cycle)) * $CSSF_{intra}$ |
| DRX cycle > 320 ms | max(400 ms, ceil(Y * $K_p$ * $K_{layer1\_measurement}$) * max (MGRP, SMTC period, DRX cycle)) * $CSSF_{intra}$ |

"$M_2$" can be set to a value less than "1.5" for the FR2 high-speed mode, and to "1.5" otherwise (e.g., "$M_2=1.5$" if "SMTC period>40 ms", otherwise "$M_2=1$"). "Y" can be decreased for the FR2 high-speed mode such as by being set to "8" or "16" when the SMTC period is less than forty milliseconds, and to a higher value otherwise (e.g., "Y=24" if "SMTS>40 ms", otherwise "Y=8 or 16").

In a fifth example of the FR2 high-speed mode, when the UE is also operating in the connected mode, time periods for intra-frequency measurements without gaps can be defined. The definitions are similar to the above first and second examples including time period of PSS/S detection, time period of time index detection, and measurement period for inter-frequency without gaps. Generally, the sample number of L1 filtering can be reduced based on the UE beam sweeping capability "N". Other parameters, such as scaling factors, fixed values, network configurations, etc. can also be reduced to allow for faster detections.

In a sixth example of the FR2 high-speed mode, when the UE is also operating in the connected mode, time periods for intra-frequency measurements with gaps can be defined. The definitions are similar to the above third and fourth examples including time period of PSS/S detection, time period of time index detection, and measurement period for inter-frequency with gaps. Here also, generally, the sample number of L1 filtering can be reduced based on the UE beam sweeping capability "N". Other parameters, such as scaling factors, fixed values, network configurations, etc. can also be reduced to allow for faster detections.

In a seventh example of the FR2 high-speed mode, when the UE is also operating in the connected mode, parameters for enhancing L1-RSRP measurements can be used and are shown in Table 10.

TABLE 10

| DRX cycle | $T_{L1-SINR\_Measurement\_Period\_CSI-RS\_CMR\_Only}$ (ms) |
| --- | --- |
| No DRX | max($T_{Report}$, ceil(M * P * N) * $T_{CSI-RS}$) |
| DRX cycle ≤ 320 ms | max($T_{Report}$, ceil(1.5 * M * P * N)*max($T_{DRX}$, $T_{CSI-RS}$)) |
| DRX cycle > 320 ms | ceil(M * P * N) * $T_{DRX}$ |

In the above table, "N" does not represent the UE beam sweeping capability. Instead, N can be a network parameter set to "1" (e.g., via RRC signaling). Further, "P" can be set to "1" (also via RRC signaling") when the UE is in a monitored cell and there are no measurements gaps overlapping with any occasions of the CSI-RS. The value of "M" can also be set via RRC signaling. "M" is set to "1" for periodic or semi-persistent CSI-RS resource as CMR if higher layer parameter timeRestrictionForChannelMeasurement is configured, set to "3" otherwise. "M" is set to one for aperiodic CSI-RS resources as CMR.

Additional or alternative variations may be used. In an illustration, the scaling factor of "1.5" in the above table can be reduced (e.g., to "1" or another value smaller than "1.5") for the DRX cycle shorter than three-hundred and twenty milliseconds and/or for the SMTC period shorter than forty milliseconds.

In an eight example of the FR2 high-speed mode, when the UE is also operating in the connected mode, parameters for enhancing L1-RSRP reporting with SSB-based CMR and dedicated IMR can be used and are shown in Table 11.

TABLE 11

| DRX cycle | $T_{L1-SINR\_Measurement\_Period\_SSB\_CMR\_IMR}$ (ms) |
| --- | --- |
| No DRX | max($T_{Report}$, ceil(M * P * N) * $T_{SSB}$) |
| DRX cycle ≤ 320 ms | max($T_{Report}$, ceil(1.5 * M * P * N) * max($T_{DRX}$, $T_{SSB}$)) |
| DRX cycle > 320 ms | ceil(1.5 * M * P *N) * $T_{DRX}$ |

In the above table, "N" does not represent the UE beam sweeping capability. Instead, N can be a network parameter set to "8" (e.g., via RRC signaling). Further, "P" can be set to "1" (also via RRC signaling") when the UE is in a monitored cell and there are no measurements gaps overlapping with any occasions of the CSI-RS. The value of "M" can also be set via RRC signaling. "M" is set to "1" for periodic or semi-persistent CSI-RS resource as CMR if higher layer parameter timeRestrictionForChannelMeasurement is configured, set to "3" otherwise. "M" is set to one for aperiodic CSI-RS resources as CMR.

Additional or alternative variations may be used. In an illustration, the scaling factor of "1.5" in the above table can be reduced (e.g., to "1" or another value smaller than "1.5") for the DRX cycle shorter than three-hundred and twenty milliseconds and/or for the SMTC period shorter than forty milliseconds.

In a ninth example of the FR2 high-speed mode, when the UE is also operating in the connected mode, parameters for enhancing L1-RSRP reporting with CSI-RS based CMR and dedicated IMR configured can be used and are shown in Table 12.

TABLE 12

| DRX cycle | $T_{L1\text{-}SINR\_Measurement\_Period\_CSI\text{-}RS\_CMR\_IMR}$ (ms) |
|---|---|
| No DRX | max($T_{Report}$, ceil(M * P * N) * $T_{CSI\text{-}RS}$) |
| DRX cycle ≤ 320 ms | max($T_{Report}$, ceil(1.5 * M * P * N)*max ($T_{DRX}$, $T_{CSI\text{-}RS}$)) |
| DRX cycle > 320 ms | ceil(M * P *N) * $T_{DRX}$ |

In the above table, "N" does not represent the UE beam sweeping capability. Instead, N can be a network parameter set to "1" (e.g., via RRC signaling). Likewise, "M" can be set to "1" via RRC signaling. Further, "P" can be set to "1" (also via RRC signaling") when the UE is in a monitored cell and there are no measurements gaps overlapping with any occasions of the CSI-RS.

Additional or alternative variations may be used. In an illustration, the scaling factor of "1.5" in the above table can be reduced (e.g., to "1" or another value smaller than "1.5") for the DRX cycle shorter than three-hundred and twenty milliseconds and/or for the SMTC period shorter than forty milliseconds.

Figure 6:
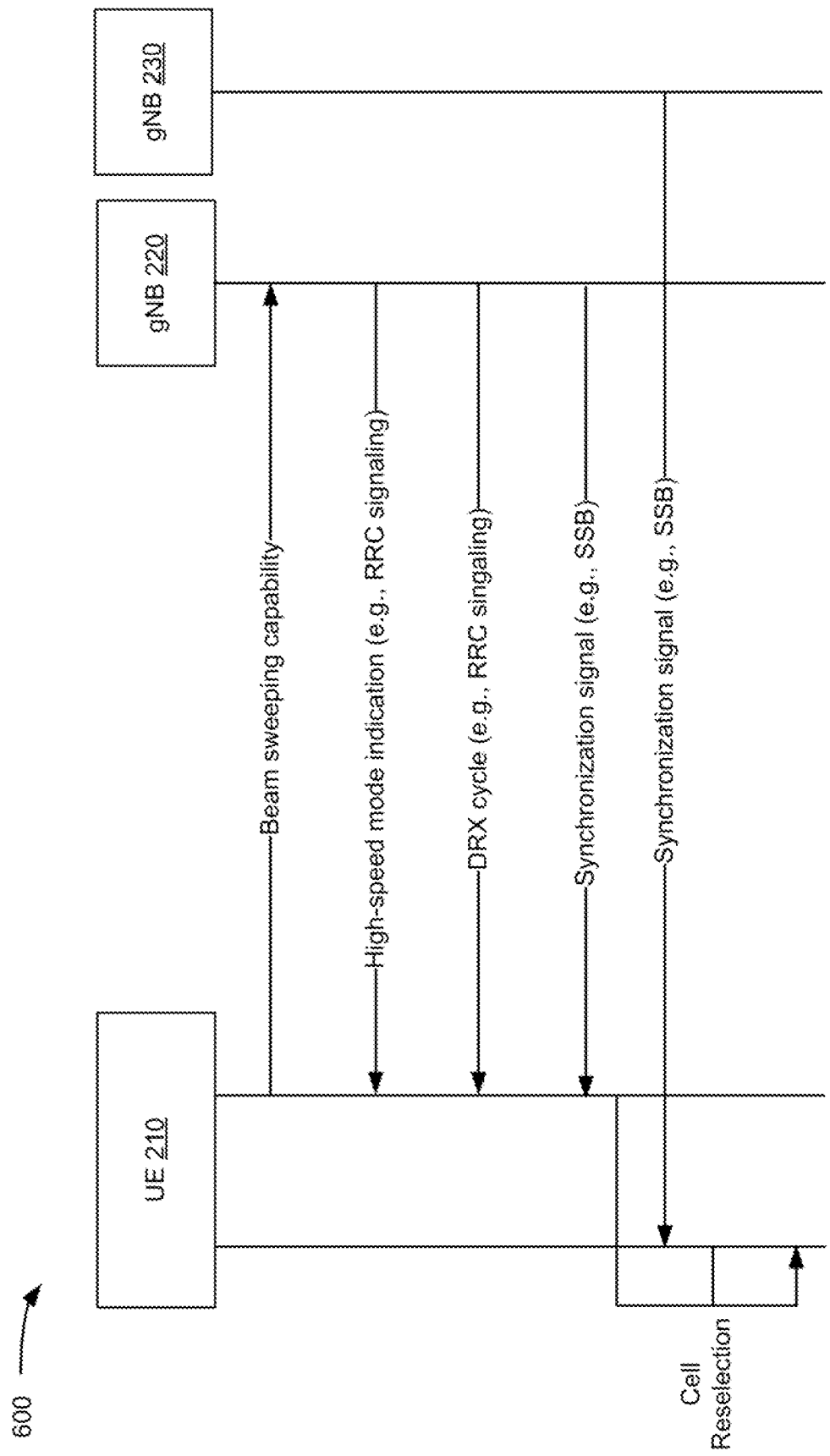
FIG. 6 illustrates an example of a diagram for UE-base station communications in support of cell reselection by a UE in a high-speed mode, in accordance with some embodiments.

FIG. 6 illustrates an example of a diagram 600 for UE-base station communications in support of cell reselection by a UE in a high-speed mode, in accordance with some embodiments. In particular, a UE 210 is in communication with a gNB 220 (e.g., camped on gNB while being in a high-speed mode and an idle mode), where the communication uses at least one FR2 band. The UE reports its beam sweeping capability to the gNB 220. For instance, the UE sends "N" (e.g., the value of "N" between one and eight) to the gNB 220 as capability information in an information element (IE) specific. The gNB 220 can beforehand or thereafter send an indication to the UE 210 that the UE 210 is operating in a high-speed mode. For instance, this indication can be sent via RRC signaling (e.g., as a flag in an RRC configuration).

The gNB 220 also configures the length of the DRX cycle for the UE 210 by using, for instance, RRC signaling. In an example, the DRX cycle length is set based on the UE beam sweeping capability. For instance, the smaller "N" is, the longer the DRX cycle can become because the gNB 220 can assume that the UE 210 is capable of completing any detection, measurement, evaluation in shorter times given that the UE's 210 processing need not involve all of the eight beams.

The gNB 220 sends synchronization signals to the UE 210 (e.g., SSBs, each on a beam, and each having an SSB periodicity). Another gNB 230 sends similar synchronization signals. Next, the UE 210 performs synchronization signal detections, synchronization signal measurements, and/or cell evaluations based on the synchronization signals of the two base stations 220 and 230. The specific processing depends on whether the UE 210 is in idle mode, inactive mode, or connected mode and correspond to one or more of the examples illustrated in connection with FIG. 5. Given the beam sweeping capability of the UE 210, time periods are defined for the UE to complete the processing. These time periods can be stored in the memory of the UE 210 (e.g., as tables or some other type of data structures). Accordingly, the UE 210 can determine the required time period(s) from the memory given that it is in the high-speed mode (e.g., given the high-speed mode) and the specific DRX cycle that has been configured thereto and can complete the processing in the required time period(s), thereby completing a cell reselection. In the case of the idle mode or inactive mode, the UE completes the reselection. In the case of the connected mode, the cell reselection includes the UE reports its measurements to gNB 220 and, in turn, the gNB 220 selecting the cell for a handover.

Although the gNB 220 is illustrated as configuring the UE 210 and as sending synchronization signals for cell reselection, the embodiments of the present disclosure are not limited as such. For instance, synchronization signals can be sent from multiple gNBs and evaluated by the UE 210 executing a cell selection procedure, where none of these gNBs was involved in the UE's 210 configuration set-up.

Figure 7:
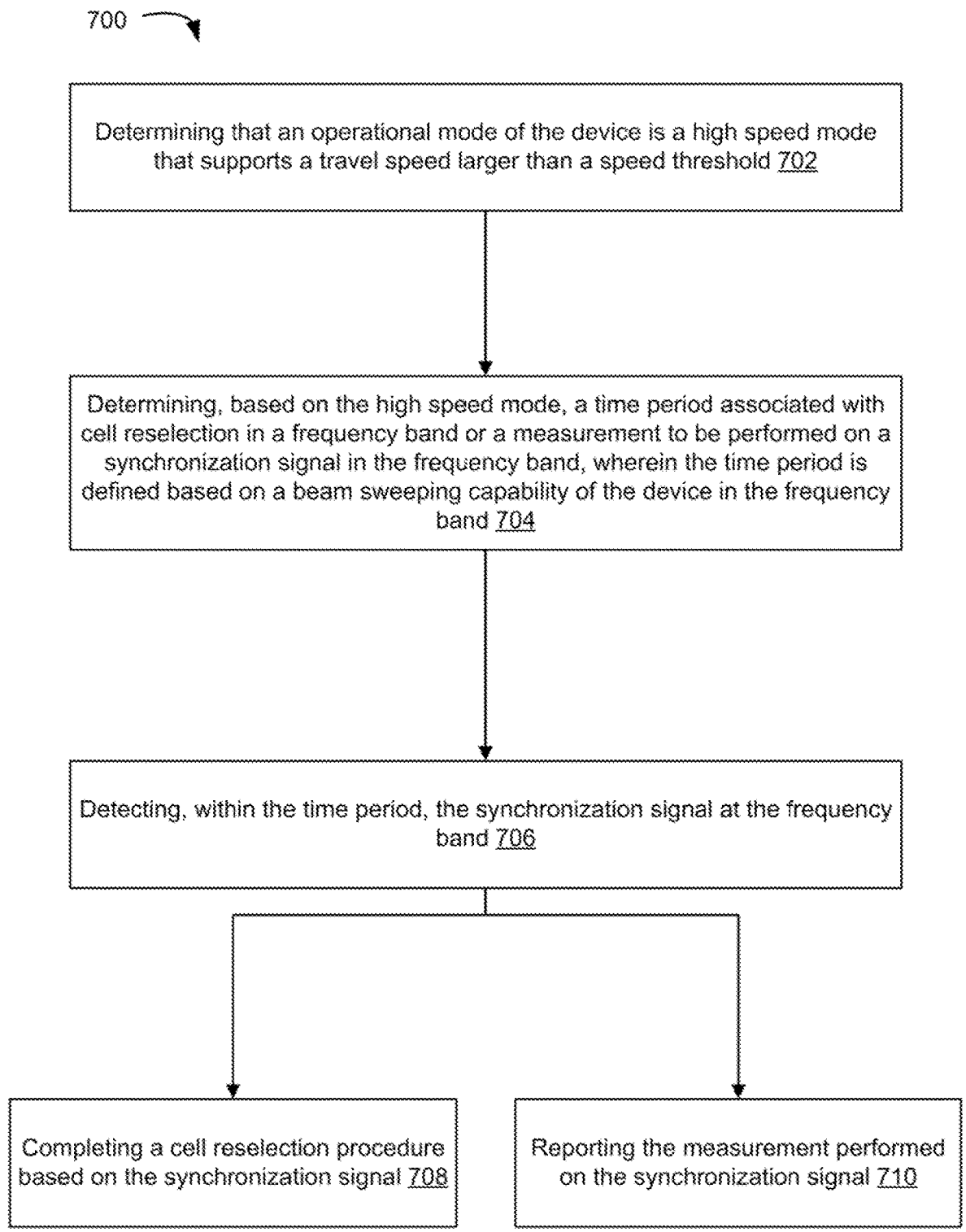
FIG. 7 illustrates an example of an operational flow/algorithmic structure for performing a synchronization signal-based cell reselection in a high-speed mode, in accordance with some embodiments.

FIG. 7 illustrates an example of an operational flow/algorithmic structure 700 for performing a synchronization signal-based cell reselection in a high-speed mode, in accordance with some embodiments. A UE can implement the operational flow/algorithmic structure 700 to reduce the time needed to complete a cell reselection procedure when operating in the FR2 high-speed mode. The operation flow/algorithmic structure 700 may be performed or implemented by the UE such as, for example, the UE 104, 1100, or components thereof, for example, processors 1104. The UE can communicate with a base station, such as a gNB. Nonetheless, the communication can similarly involve or be directed to a network that may include the base station and/or a radio network core.

The operation flow/algorithmic structure 700 may include, at 702, determining that an operational mode of the device is a high speed mode that supports a travel speed larger than a speed threshold. In an example, the UE receives RRC signaling from a base station indicating that the UE is in the high speed mode. In another illustration, the UE may determine its travel speed by receiving, for instance, location data (e.g., global positioning system (GPS) data and/or base-station estimated position data) and monitoring this location data over time. If the travel speed exceeds a speed threshold, the UE determines that it is in the high speed mode.

The operation flow/algorithmic structure 700 may include, at 704, determining, based on the high speed mode, a time period associated with cell reselection in a frequency band or a measurement to be performed on a synchronization signal in the frequency band, wherein the time period is defined based on a beam sweeping capability of the device in the frequency band. In an example, the time period can be a detection period, a measurement period, and/or an evaluation period associated with a synchronization signal and the frequency band is an FR2 band. The specific type of the time period and the specific type of synchronization signal (e.g., SSB, CSI, intra-frequency or inter-frequency, etc.) and/or measurement (e.g., RSRSP, RSRQ, etc.) can depend on whether the UE is in an idle mode, inactive mode, or connected mode and higher layer configuration for performing cell reselection. The cell reselection includes performing a cell reselection procedure by the UE in the case of the idle mode and inactive mode. In comparison, the cell reselection includes performing and reporting measurements by the UE to a base station, and the base station initiating a handover procedure as applicable. Examples of the time period are described above in connection with FIG. 6. Generally, the smaller the value "N" of the beam sweeping capability, the shorter the time period is. Such time periods can be stored in a memory of the UE. Given a DRX cycle length, the UE can determine the time period(s) usable to process synchronization signal. For instance, a time period can be determined by using the DRX cycle length in a look-up of a table stored in a memory of the UE, where the table stores values of the time period for different DRX cycle lengths. Operation 704 may be optional, whereby the UE can be preconfigured (e.g., via its program code) to automatically use the relevant time period(s) given the high-speed mode, beam sweeping capability, DRX cycle length, and type of measurements, evaluations, and/or reporting to perform.

The operation flow/algorithmic structure 700 may include, at 706, detecting, within the time period, a synchronization signal at the frequency band. For example, when the UE is in the idle mode or inactive mode, the synchronization signal is a PSS or SSS sent in an SSB sent from a base station that provides a cell at the same frequency band as the current cell that the UE is camped on. This signal is received and RSRP and RSRQ measurements are performed thereon within a measurement period. The measurements are repeated on different synchronization signals followed by a cell evaluation. The overall used time is a detection period, where the detection period is smaller than three seconds. In another example, in the case of the UE is in the connected mode, intra-frequency or inter-frequency SBB or CSI based inter, with or without measurement gaps can be performed. Of course, other types of synchronization signals and/or processing are possible as described in connection with FIG. 5.

The operation flow/algorithmic structure 700 may include, at 708, completing a cell reselection procedure based on the synchronization signal. Typically, operation 708 is performed when the UE is in the idle mode or inactive mode. For example, the above RSRP and RSRQ measurements are compared to thresholds. When they exceed the thresholds, the UE determines whether the cell reselection criteria are met for the cell. If so, the UE reselects the cell and camps thereon. Otherwise, the UE reselects the current cell and stays camped thereon.

The operation flow/algorithmic structure 700 may include, at 710, reporting the measurement performed on the synchronization signal. Typically, operation 710 when the UE is in the connected mode. For example, the UE sends the measurement in a measurement report to the base station. The measurement report or another measurement report also sent by the UE can include measurements of other synchronization signals sent from other base stations and/or corresponding to other cells. In turn, the base station can complete a cell reselection (e.g., for a handover) based on the various measurement reports.

Although not illustrated in FIG. 7, the operation flow/algorithmic structure 700 may include other operations. For instance, the UE can report its beam sweeping capability to the network and receive from the network a DRX cycle length configuration, where this configuration may be set based on the beam sweeping capability. Further, as described in connection with operation 702, the UE can receive an indication of the high-speed mode from the network. Further, although the operation flow/algorithmic structure 700 is described in connection with FR2, the operation flow/algorithmic structure 700 can apply to other frequencies including, for instance, other mmWave frequencies.

Figure 8:
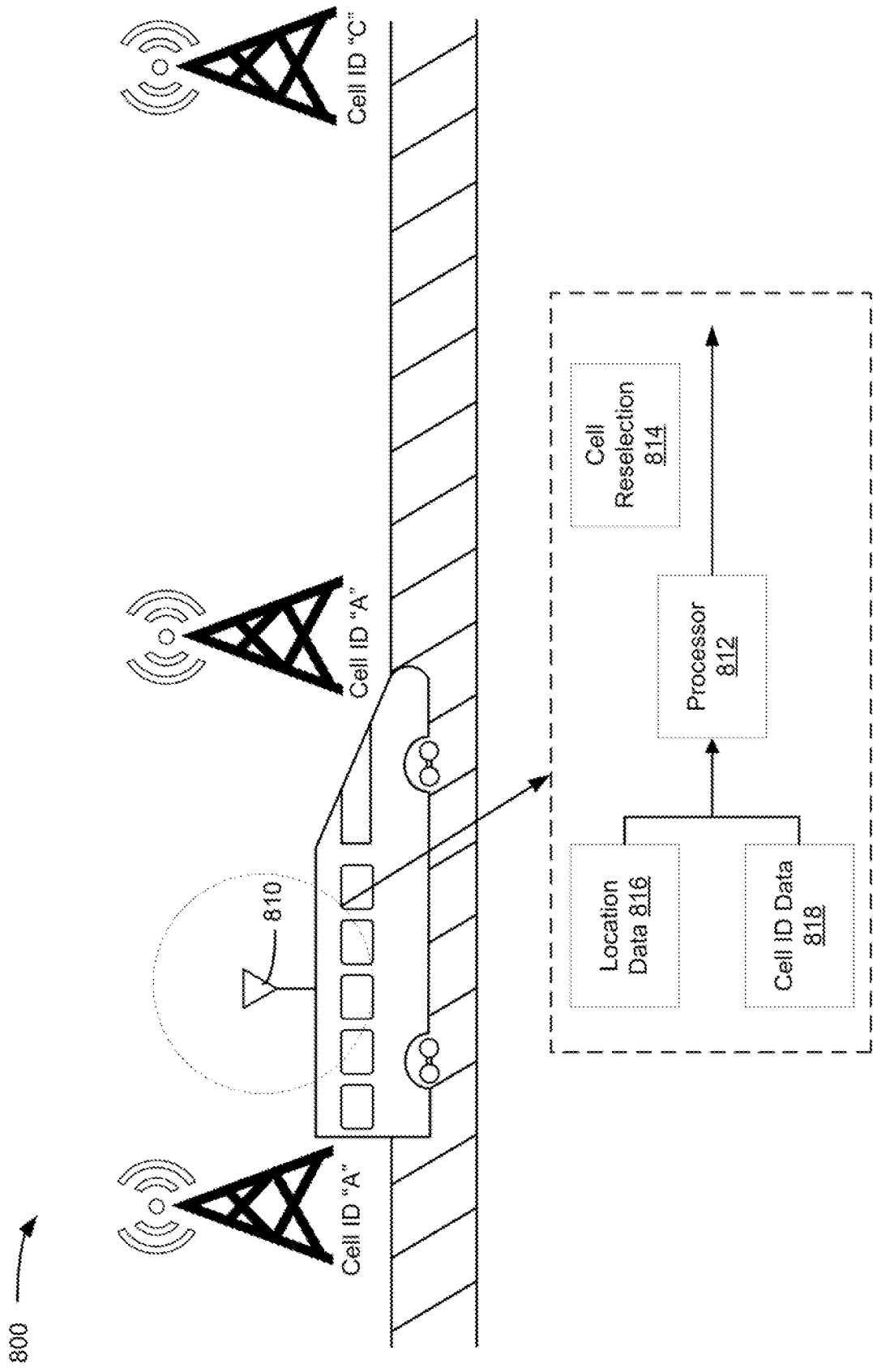
FIG. 8 illustrates an example of a location-based cell reselection, in accordance with some embodiments.

FIG. 8 illustrates an example of a location-based cell reselection 800, in accordance with some embodiments. Unlike the embodiments described herein above, the location-based cell reselection 800 does not rely on synchronization signals. Of course, the location-based cell reselection 800 can be used in combination with the techniques described herein above. Furthermore, the cell reselection 800 is described as being performed by a UE. The UE can be in an idle mode or in an inactive mode. When the UE is in the connected mode, a cell reselection can be performed by the network (e.g., a gNB) and corresponds to a location-based handover.

Similar to the description of FIG. 2, a UE 810 operates in a high-speed mode while using an FR2 band. The UE 810 may be in an idle mode, inactive mode, or a connected mode. The UE 810 includes a processor 812 that performs a cell reselection 814 based on location data 816 and cell identifier (ID) data 818. In an example, the location data 816 and the cell ID data 818 are input to the processor 812. Based on this input, the processor 812 outputs a cell ID indicating a cell reselection. The UE 810 uses the cell ID to camp on the corresponding cell. The location data 816 represents a current location of the UE 810 and can be received in real-time from the network (e.g., based on base station-based location estimation) and/or from a positioning network (e.g., a satellite-based positioning network, such as GPS), and/or can be estimated in real-time by the UE 210 by tracking its travel speed and direction over time. The cell ID data 818 can be stored in a data structure (e.g., a database) in a memory of the UE 810 and represents a map that associates different cell IDs with their respective locations (e.g., geographical locations, such as GPS locations) and with their respective synchronization signal block (SSB) absolute radio frequency channel numbers (ARFCNs). The cell ID data 818 can be pre-stored (e.g., the data base is downloaded) prior to or during the travel along the travel pathway. The processor 812 implements logic that looks-up the cell ID data 818 by comparing the location data 816 with the locations corresponding to the cell IDs. The cell ID having the closest location the location data 816 is selected and the output of the processor 812 includes this cell ID and its SSB ARFCN such that the UE 810 can camp on the corresponding cell. The rate at which the cell ID data 818 is looked up given the location data 816 can depend on the FR2 deployment scenario, the FR2 band, and the travel speed. Referring back to the above scenario "4" example, this rate can be about three seconds such that, about every three seconds, the cell ID data 818 is looked to allow the UE 810 to camp on the next cell.

Although FR2 cell reselection is described in connection with using the location data 816 and the cell ID data 818, the embodiment of the present disclosure are not limited as such. Instead, the embodiments similarly apply to FR1 cell reselection and/or other applicable mmWave frequencies. In particular, the cell ID data 818 can alternatively (e.g., for FR1 cell reselection only) or additionally (for both FR2 cell reselection and FR1 cell reselection) include the location and SSB ARFCN data for FR1. If this data is used for both FR1 and FR2, the both FR1 cell reselection and FR2 cell reselection can be performed at different rates (e.g., about every thirty seconds for FR1 and about every three seconds for FR2). Furthermore, and as indicated above, the network can perform a location-based handover when the UE 810 is in the connected mode. In this case the network (e.g., gNB) also stores the cell ID data 818 and either determines the location data 816 by estimating the location of the UE 810 or receives this estimation from the UE 810 or from a positioning system (e.g., GPS). The network then uses the location data 816 to look up the cell ID data 818, determine the closest cell ID, and initiate a handover procedure.

FIG. 9 illustrates an example of an operational flow/algorithmic structure 900 for performing a location-based cell reselection in a high-speed mode, in accordance with some embodiments. A UE can implement the operational flow/algorithmic structure 900 to perform a cell reselection procedure without relying on synchronization signals. The operation flow/algorithmic structure 900 may be performed or implemented by the UE such as, for example, the UE 104, 1100, or components thereof, for example, processors 1104.

The operation flow/algorithmic structure 900 may include, at 902, storing database that associates the cell identifiers with respective locations and respective synchronization signal block (SSB) absolute radio frequency channel numbers (ARFCNs). The operation flow/algorithmic structure 900 may include, at 904, reporting capability to perform cell reselection based on location data. In an example, this capability is reported in an IE to the network, where the network can increase the DRX cycle length of the UE since the UE needs to monitor synchronization signals for the cell reselection. Operations 902 and 904 are illustrated with dotted boxes in FIG. 9 because they can be optional and/or implemented separately from the remaining operations.

The operation flow/algorithmic structure 900 may include, at 906, determining that an operational mode of the device is a high speed mode that supports a travel speed larger than a speed threshold. In an example, the UE receives RRC signaling from a base station indicating that the UE is in the high speed mode. In another illustration, the UE may determine its travel speed by receiving, for instance, location data (e.g., global positioning system (GPS) data and/or base-station estimated position data) and monitoring this location data over time. If the travel speed exceeds a speed threshold, the UE determines that it is in the high speed mode.

The operation flow/algorithmic structure 900 may include, at 908, determining a location of the device. In an example, the UE can receive location data from the network (e.g., from a base station) and/or from another positioning system (e.g., from GPS, whereby the UE includes a GPS receiver), and/or can estimate its location by tracking its travel speed and travel direction over time.

The operation flow/algorithmic structure 900 may include, at 910, determining based on the high speed mode and the location, an identifier of a cell from a set of cell identifiers. For example, the UE used the location data to look up the database and determine the cell ID that is closest to the UE (e.g., the geographically closest base station that provides a cell having that cell D).

The operation flow/algorithmic structure 900 may include, at 912, performing a cell reselection based on the identifier. In an example, an assumption is made that the closest base station provides the best cell coverage. Accordingly, the UE camps on the cell having the cell ID determined at operation 910.

Although the operation flow/algorithmic structure 900 is illustrated as being performed by the UE and typically corresponds to a UE performing a cell reselection when operating in an idle mode or inactive mode, some operation of this structure 900 similarly apply to a cell reselection when the UE is operating in the connected mode. In this case, the various operations may be performed by the network (e.g., gNB). For instance, the network also stores the database and either determines the location of the UE by estimating it or receives this estimation from the UE or from a positioning system (e.g., GPS). The network then uses the location to look up the database, determine the closest cell ID, and initiate a handover procedure.

FIG. 10 illustrates receive components 1000 of the UE 104 in accordance with some embodiments. The receive components 1000 may include an antenna panel 1004 that includes a number of antenna elements. The panel 1004 is shown with four antenna elements, but other embodiments may include other numbers.

The antenna panel 1004 may be coupled to analog beamforming (BF) components that include a number of phase shifters 1008(1)-1008(4). The phase shifters 1008(1)-1008(4) may be coupled with a radio-frequency (RF) chain 1012. The RF chain 1012 may amplify a receive analog RF signal, downconvert the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values, to the phase shifters 1008(1)-1008(4) to provide a receive beam at the antenna panel 1004. These BF weights may be determined based on the channel-based beamforming.

Figure 11:
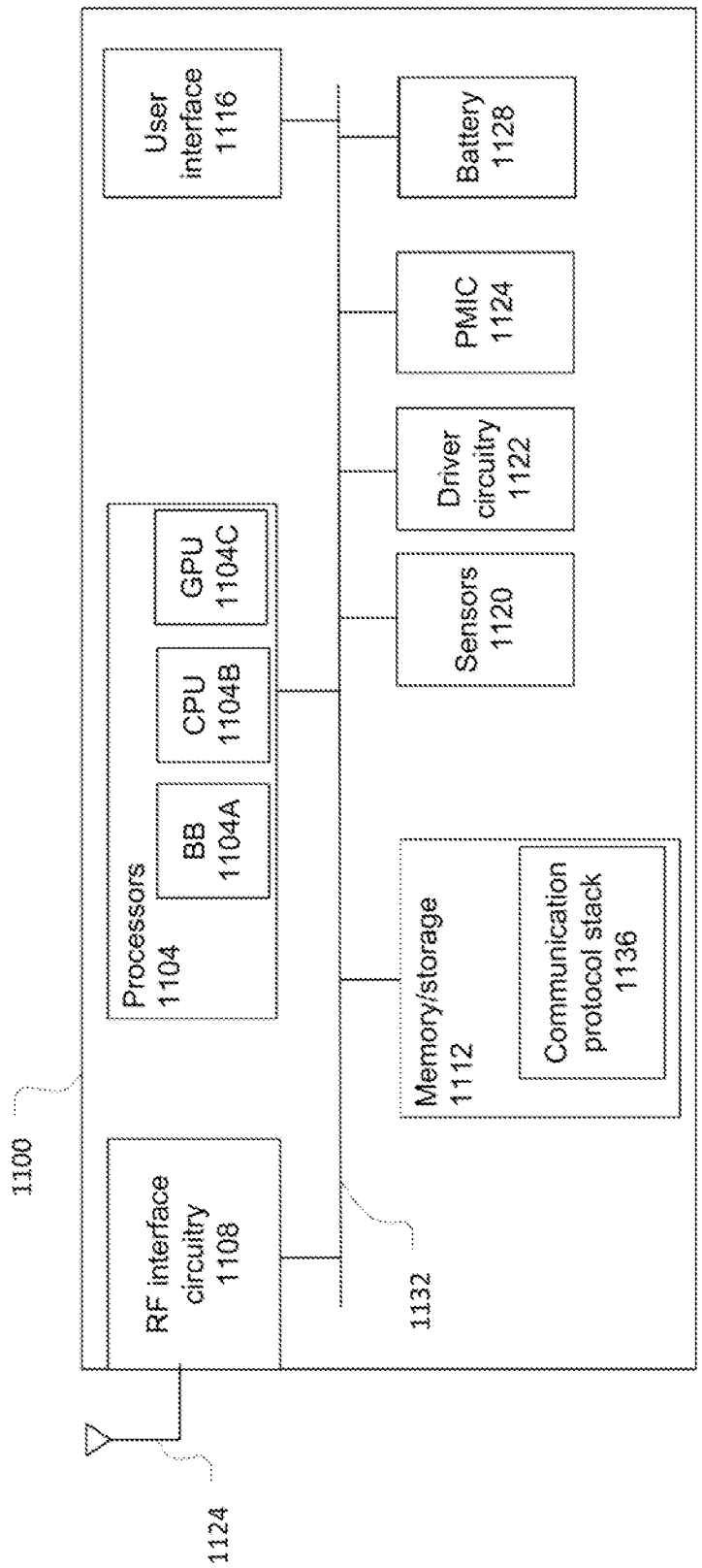
FIG. 11 illustrates an example of a UE, in accordance with some embodiments.

FIG. 11 illustrates a UE 1100 in accordance with some embodiments. The UE 1100 may be similar to and substantially interchangeable with UE 114 of FIG. 1.

Similar to that described above with respect to UE 114, the UE 1100 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices, or relaxed-IoT devices. In some embodiments, the UE may be a reduced capacity UE or NR-Light UE.

The UE 1100 may include processors 1104, RF interface circuitry 1108, memory/storage 1112, user interface 1116, sensors 1120, driver circuitry 1122, power management integrated circuit (PMIC) 1124, and battery 1128. The components of the UE 1100 may be implemented as integrated circuits (ICs), portions thereof, discrete electronic devices, or other modules, logic, hardware, software, firmware, or a combination thereof. The block diagram of FIG. 11 is intended to show a high-level view of some of the components of the UE 1100. However, some of the components shown may be omitted, additional components may be present, and different arrangements of the components shown may occur in other implementations.

The components of the UE 1100 may be coupled with various other components over one or more interconnects 1132, which may represent any type of interface, input/output, bus (local, system, or expansion), transmission line, trace, optical connection, etc. that allows various circuit components (on common or different chips or chipsets) to interact with one another.

The processors 1104 may include processor circuitry such as, for example, baseband processor circuitry (BB) 1104A, central processor unit circuitry (CPU) 1104B, and graphics processor unit circuitry (GPU) 1104C. The processors 1104 may include any type of circuitry or processor circuitry that executes or otherwise operates computer-executable instructions, such as program code, software modules, or functional processes from memory/storage 1112 to cause the UE 1100 to perform operations as described herein.

In some embodiments, the baseband processor circuitry 1104A may access a communication protocol stack 1136 in the memory/storage 1112 to communicate over a 3GPP compatible network. In general, the baseband processor circuitry 1104A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1108.

The baseband processor circuitry 1104A may generate or process baseband signals or waveforms that carry information in 3GPP-compatible networks. In some embodiments, the waveforms for NR may be based on cyclic prefix OFDM (CP-OFDM) in the uplink or downlink, and discrete Fourier transform spread OFDM (DFT-S-OFDM) in the uplink.

The baseband processor circuitry 1104A may also access group information 1124 from memory/storage 1112 to determine search space groups in which a number of repetitions of a PDCCH may be transmitted.

The memory/storage 1112 may include any type of volatile or non-volatile memory that may be distributed throughout the UE 1100. In some embodiments, some of the memory/storage 1112 may be located on the processors 1104 themselves (for example, L1 and L2 cache), while other memory/storage 1112 is external to the processors 1104 but accessible thereto via a memory interface. The memory/storage 1112 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1108 may include transceiver circuitry and a radio frequency front module (RFEM) that allows the UE 1100 to communicate with other devices over a radio access network. The RF interface circuitry 1108 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 1124 and proceed to filter and amplify (with a low-noise amplifier) the signal. The signal may be provided to a receiver of the transceiver that down-converts the RF signal into a baseband signal that is provided to the baseband processor of the processors 1104.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1124.

In various embodiments, the RF interface circuitry 1108 may be configured to transmit/receive signals in a manner compatible with NR access technologies.

The antenna 1124 may include a number of antenna elements that each convert electrical signals into radio waves to travel through the air and to convert received radio waves into electrical signals. The antenna elements may be arranged into one or more antenna panels. The antenna 1124 may have antenna panels that are omnidirectional, directional, or a combination thereof to enable beamforming and multiple input, multiple output communications. The antenna 1124 may include microstrip antennas, printed antennas fabricated on the surface of one or more printed circuit boards, patch antennas, phased array antennas, etc. The antenna 1124 may have one or more panels designed for specific frequency bands including bands in FR1 or FR2.

The user interface circuitry 1116 includes various input/output (I/O) devices designed to enable user interaction with the UE 1100. The user interface 1116 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1100.

The sensors 1120 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers; gyroscopes; or magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example; cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1122 may include software and hardware elements that operate to control particular devices that are embedded in the UE 1100, attached to the UE 1100, or otherwise communicatively coupled with the UE 1100. The driver circuitry 1122 may include individual drivers allowing other components to interact with or control various input/output (I/O) devices that may be present within, or connected to, the UE 1100. For example, driver circuitry 1122 may include a display driver to control and allow access to a display device, a touchscreen driver to control and allow access to a touchscreen interface, sensor drivers to obtain sensor readings of sensor circuitry 1120 and control and allow access to sensor circuitry 1120, drivers to obtain actuator positions of electro-mechanic components or control and allow access to the electro-mechanic components, a camera driver to control and allow access to an embedded image capture device, audio drivers to control and allow access to one or more audio devices.

The PMIC 1124 may manage power provided to various components of the UE 1100. In particular, with respect to the processors 1104, the PMIC 1124 may control power-source selection, voltage scaling, battery charging, or DC-to-DC conversion.

In some embodiments, the PMIC 1124 may control, or otherwise be part of, various power saving mechanisms of the UE 1100. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1100 may power down for brief intervals of time and thus save power. If there is no data traffic activity for an extended period of time, then the UE 1100 may transition off to an RRC_Idle state, where it disconnects from the network and does not perform operations such as channel quality feedback, handover, etc. The UE 1100 goes into a very low power state and it performs paging where again it periodically wakes up to listen to the network and then powers down again. The UE 1100 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1128 may power the UE 1100, although in some examples the UE 1100 may be mounted deployed in a fixed location, and may have a power supply coupled to an electrical grid. The battery 1128 may be a lithium ion battery, a metal-air battery, such as a zinc-air battery, an aluminum-air battery, a lithium-air battery, and the like. In some implementations, such as in vehicle-based applications, the battery 1128 may be atypical lead-acid automotive battery.

Figure 12:
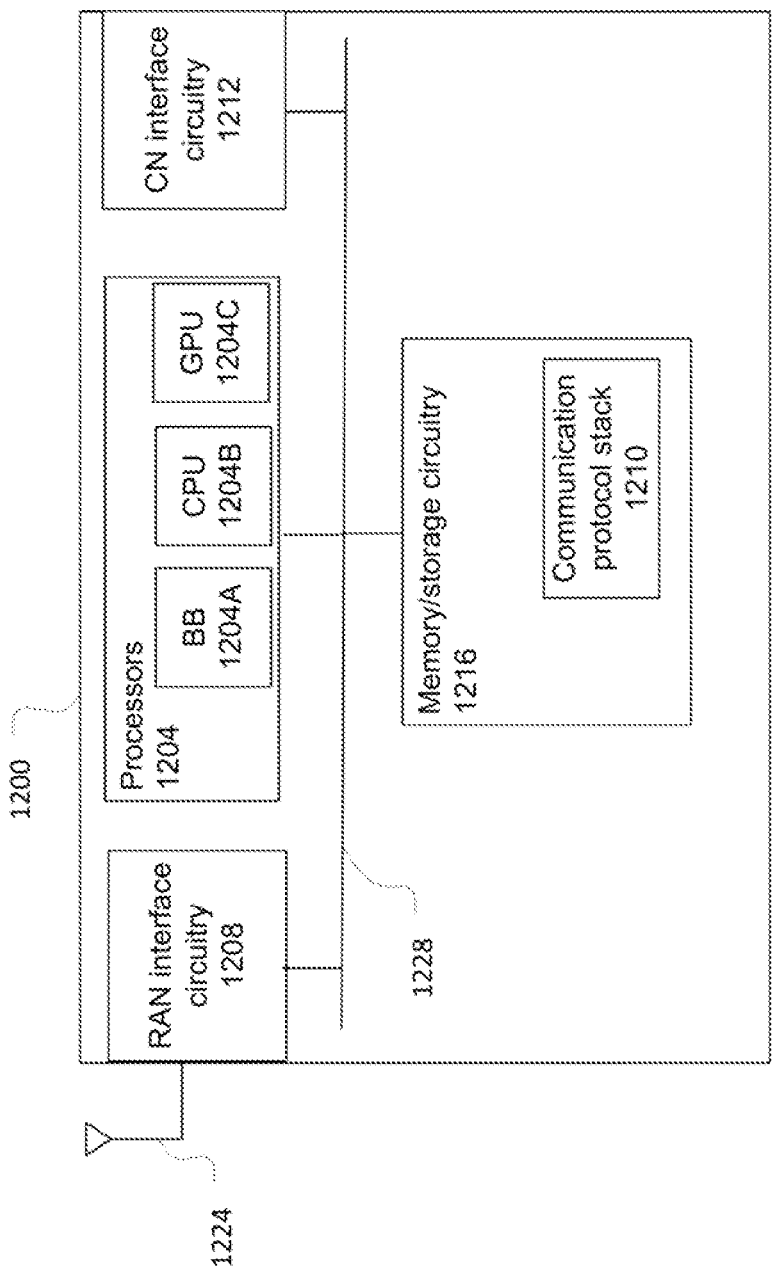
FIG. 12 illustrates an example of a base station, in accordance with some embodiments.

FIG. 12 illustrates a gNB 1200 in accordance with some embodiments. The gNB node 1200 may be similar to and substantially interchangeable with gNB 108. A base station, such as the base station 122, can have the same or similar components as the gNB 1200.

The gNB 1200 may include processors 1204, RF interface circuitry 1208, core network (CN) interface circuitry 1212, and memory/storage circuitry 1216.

The components of the gNB 1200 may be coupled with various other components over one or more interconnects 1228.

The processors 1204, RF interface circuitry 1208, memory/storage circuitry 1216 (including communication protocol stack 1210), antenna 1224, and interconnects 1228 may be similar to like-named elements shown and described with respect to FIG. 10.

The CN interface circuitry 1212 may provide connectivity to a core network, for example, a 5$^{th}$ Generation Core network (5GC) using a 5GC-compatible network interface protocol such as carrier Ethernet protocols, or some other suitable protocol. Network connectivity may be provided to/from the gNB 1200 via a fiber optic or wireless backhaul. The CN interface circuitry 1212 may include one or more dedicated processors or FPGAs to communicate using one or more of the aforementioned protocols. In some implementations, the CN interface circuitry 1212 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method. The method is implemented on a device. The method comprises: determining that an operational mode of the device is a high-speed mode that supports a travel speed larger than a speed threshold; detecting a synchronization signal at a frequency band within a time period that is associated with cell reselection in the frequency band, wherein the time period is associated with the high-speed mode and is defined based on a beam-sweeping capability of the device in the frequency band; and completing a cell reselection procedure based on the synchronization signal. In addition or alternative to the time period being associated with cell reselection, example 1 includes the time period being associated with a measurement to be performed on the synchronization signal in the frequency band. In addition or alternative to completing the cell reselection procedure, example 1 includes reporting report the measurement performed on the synchronization signal.

Example 2 includes a method of example 1, wherein the frequency band is a frequency range 2 (FR2) band between 24,250 MHz and 52,600 MHz, and wherein the beam sweeping capability indicates that the device is capable of using a reduced set of beams for beam sweeping.

Example 3 includes a method of any preceding examples 1-2, wherein the device is in an inactive mode or an idle mode while also being in the high speed mode, the synchronization signal is associated with a cell, and the method further comprises: performing a first number of synchronization signal reference signal received power (SS-RSRP) measurements and reference synchronization signal received quality (SS-RSRQ) measurements, wherein an SS-RSRP measurement of the SS-RSRP measurements and an SS-RSRQ measurement of the SS-RSRQ measurements correspond to the synchronization signal; performing a second number of cell evaluations based on the SS-RSRP measurements and the SS-RSRQ measurements; and selecting the cell to camp on based on the cell evaluations.

Example 4 includes a method of example 3, wherein the first number or the second number is based on the beam sweeping capability of the device.

Example 5 includes a method of example 3, wherein the time period is a measurement period, and the method further comprises: determining a detection period and an evaluation period, wherein the detection period and the evaluation period are defined based on the beam sweeping capability of the device.

Example 6 includes a method of example 5, wherein the first number or the second number is based on the detection period, the measurement period, and the evaluation period.

Example 7 includes a method of any preceding examples 1-6, wherein the beam sweeping capability is a receive beam sweeping capability, and the method further comprises: reporting the receive beam sweeping capability to a base station.

Example 8 includes a method of example 7, wherein the method further comprises: receiving, from the base station, radio resource control (RRC) signaling indicating a discontinuous reception (DRX) cycle length based on the receive beam sweeping capability.

Example 9 includes a method of example 8, wherein the time period is a measurement period that is further defined based on the DRX cycle length.

Example 10 includes a method of any preceding examples 1-9, wherein the time period is a measurement period that is defined in a table, and wherein the table associates the measurement period with a discontinuous reception (DRX) cycle length, a detection duration, and an evaluation duration.

Example 11 includes a method of example 10, wherein each of the measurement period, the detection duration, and the evaluation duration are defined in the table as a function of the beam sweeping capability.

Example 12 includes a method of example 1, wherein the device is in an inactive mode or an idle mode while also being in the high speed mode, the time period is a detection period, the method further comprises performing inter-frequency measurement based on the synchronization signal, the cell reselection procedure is completed within the detection period, and a relaxation value for the detection period is unavailable or reduced in the inactive mode or the idle mode while the device is also in the high speed mode.

Example 13 includes a method of example 1, wherein the device is in an inactive mode or an idle mode while also being in the high speed mode, the method further comprises: performing a synchronization signal reference signal received power (SS-RSRP) measurement and a reference synchronization signal received quality (SS-RSRQ) measurement; and comparing the SS-RSRP measurement with a first measurement threshold, and the SS-RSRQ measurement with a second measurement threshold, wherein the first measurement threshold or the second measurement threshold is based on the high speed mode.

Example 14 includes a method of example 1, wherein the frequency band is a frequency range 2 (FR2) band, the device is in a connected mode while also being in the high speed mode, the measurement is reported to a base station, and the time period is a primary synchronization signal (PSS)/secondary synchronization signal (SSS) detection period, a measurement period for intra-frequency measurements, a measurement period for inter-frequency measurements, or a measurement period for layer 1 signal-to-interference and noise ratio (L1-SINR) reporting with synchronization signal block (SSB) based channel measurement resource (CMR) and dedicated interference measurement (IMR) configured.

Example 15 includes a method of example 1, wherein the frequency band is a frequency range 2 (FR2) band, the device is in a connected mode while also being in the high speed mode, the time period is a measurement period that is defined in a table, the table is defined for the FR2 bad and associates the time period with a discontinuous reception (DRX) cycle length.

Example 16 includes a method of example 15, wherein the time period is defined in the table based on the beam sweeping capability of the device.

Example 17 includes a method of example 15, wherein the time period is defined in the table based on a number of measurements to perform, and wherein a value of the number is reduced in the high speed mode based on the beam sweeping capability of the device.

Example 18 includes a method of example 1, wherein the frequency band is a frequency range 2 (FR2) band, the device is in a connected mode while also being in the high speed mode, and the method further comprising reporting the beam sweeping capability to a base station.

Example 19 includes a method. The method is implemented on a device. The method comprises: determining that an operational mode of the device is a high speed mode that supports a travel speed larger than a speed threshold; determining a location of the device; determining, based on the high speed mode and the location, an identifier of a cell from a set of cell identifiers; and performing a cell reselection based on the identifier.

Example 20 includes a method of example 19, further comprising: storing a database that associates the cell identifiers with respective locations and respective synchronization signal block (SSB) absolute radio frequency channel numbers (ARFCNs); and reporting, to a base station, capability to perform the cell reselection based on location data.

Example 21 includes a UE comprising means to perform one or more elements of a method described in or related to any of the examples 1-18, 19-20, or 1-20.

Example 22 includes one or more non-transitory computer-readable media comprising instructions to cause a UE, upon execution of the instructions by one or more processors of the UE, to perform one or more elements of a method described in or related to any of the examples 1-18, 19-20, or 1-20.

Example 23 includes a UE comprising logic, modules, or circuitry to perform one or more elements of a method described in or related to any of the examples 1-18, 19-20, or 1-20.

Example 24 includes a UE comprising: one or more processors and one or more computer-readable media comprising instructions that, when executed by the one or more processors, cause the one or more processors to perform one or more elements of a method described in or related to any of the examples 1-18, 19-20, or 1-20.

Example 25 includes a system comprising means to perform one or more elements of a method described in or related to any of the examples 1-18, 19-20, or 1-20.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   determining that an operational mode of a device is a high-speed mode that supports a travel speed larger than a speed threshold;
   detecting a synchronization signal at a frequency range 2 (FR2) band within a time period that is associated with cell reselection in the FR2 band, wherein the time period is associated with the high-speed mode, is defined based on a beam-sweeping capability of the device in the FR2 band, and includes a measurement period that is defined for the FR2 band and that is associated with a discontinuous reception (DRX) cycle length; and completing a cell reselection procedure based on the synchronization signal.

2. The method of claim 1, wherein the FR2 band between 24,250 NMH, and 52,600 MHz, and wherein the beam-sweeping capability indicates that the device is capable of using a reduced set of beams for beam-sweeping.

3. The method of claim 1, wherein the device is in an inactive mode or an idle mode while also being in the high-speed mode, the synchronization signal is associated with a cell, and the method further comprises:

performing a first number of synchronization signal reference signal received power (SS-RSRP) measurements and reference synchronization signal received quality (SS-RSRQ) measurements, wherein an SS-RSRP measurement of the SS-RSRP measurements and an SS-RSRQ measurement of the SS-RSRQ measurements correspond to the synchronization signal;

performing a second number of cell evaluations based on the SS-RSRP measurements and the SS-RSRQ measurements; and selecting the cell to camp on based on the cell evaluations.

4. The method of claim 3, wherein the first number or the second number is based on the beam-sweeping capability of the device.

5. The method of claim 3, further comprising:

determining a detection period and an evaluation period, wherein the detection period and the evaluation period are defined based on the beam-sweeping capability of the device.

6. The method of claim 5, wherein the first number or the second number is based on the detection period, the measurement period, and the evaluation period.

7. The method of claim 1, wherein the beam-sweeping capability is a receive beam-sweeping capability, and the method further comprises:

reporting the receive beam-sweeping capability to a base station.

8. The method of claim 7, wherein the method further comprises:

processing radio resource control (RRC) signaling that is receives from the base station and that indicates the DRX cycle length based on the receive beam-sweeping capability.

9. The method of claim 8, wherein the measurement period is further defined based on the DRX cycle length.

10. One or more non-transitory computer-readable storage media storing instructions, that upon execution on a device, cause the device to perform operations comprising:

determining that an operational mode of the device is a high-speed mode that supports a travel speed larger than a speed threshold;

determining, based on the high-speed mode, a time period associated with cell reselection in a frequency range 2 (FR2) band, wherein the time period is defined based on a beam-sweeping capability of the device in the FR2 band and includes a measurement period that is defined for the FR2 band and that is associated with a discontinuous reception (DRX) cycle length;

detecting, within the time period, a synchronization signal at the FR2 band; and completing a cell reselection procedure based on the synchronization signal.

11. The one or more non-transitory computer-readable storage media of claim 10, wherein the measurement period is defined in a table, and wherein the table associates the measurement period with the DRX cycle length, a detection duration, and an evaluation duration.

12. The one or more non-transitory computer-readable storage media of claim 11, wherein each of the measurement period, the detection duration, and the evaluation duration are defined in the table as a function of the beam-sweeping capability.

13. The one or more non-transitory computer-readable storage media of claim 10, wherein the device is in an inactive mode or an idle mode while also being in the high-speed mode, the time period is a detection period, the operations further comprise performing inter-frequency measurement based on the synchronization signal, the cell reselection procedure is completed within the detection period, and a relaxation value for the detection period is unavailable or reduced in the inactive mode or the idle mode while the device is also in the high-speed mode.

14. The one or more non-transitory computer readable storage media of claim 10, wherein the device is in an inactive mode or an idle mode while also being in the high-speed mode, the operations further comprise:

performing a synchronization signal reference signal received power (SS-RSRP) measurement and a reference synchronization signal received quality (SS-RSRQ) measurement, and comparing the SS-RSRP measurement with a first measurement threshold, and the SS-RSRQ measurement with a second measurement threshold, wherein the first measurement threshold or the second measurement threshold is based on the high-speed mode.

15. A device comprising:

processing circuitry configured to:

determine that an operational mode of the device is a high-speed mode that supports a travel speed larger than a speed threshold;

detect a synchronization signal at a frequency range 2 (FR2) band within a time period that is associated with cell reselection in the FR2 band or with a measurement to be performed on the synchronization signal, wherein the time period is associated with the high-speed mode, is defined based on a beam-sweeping capability of the device in the FR2 band, and includes a measurement period that is defined for the FR2 band and that is associated with a discontinuous reception (DRX) cycle length; and complete a cell reselection procedure based on the synchronization signal or report the measurement performed on the synchronization signal.

16. The device of claim 15, wherein the device is in a connected node while also being in the high-speed mode, the measurement is reported to a base station, and the time period is a primary synchronization signal (PSS)/secondary synchronization signal (SSS) detection period, a measurement period for intra-frequency measurements, a measurement period for inter-frequency measurements, or a measurement period for layer 1 signal-to-interference and noise ratio (L1-SINR) reporting with synchronization signal block (SSB) based channel measurement resource (CMR) and dedicated interference measurement (IMR) configured.

17. The device of claim 15, wherein the device is in a connected mode while also being in the high-speed mode, the measurement period is defined in a table, the table is defined for the FR2 band and associates the time period with the DRX cycle length.

18. The device of claim 17, wherein the time period is defined in the table based on the beam-sweeping capability of the device.

19. The device of claim 17, wherein the time period is defined in the table based on a number of measurements to perform, and wherein a value of the number is reduced in the high-speed mode based on the beam-sweeping capability of the device.

20. The device of claim 15, wherein the device is in a connected mode while also being in the high-speed mode, and the processing circuitry is further configured to report the beam-sweeping capability to a base station.

* * * * *